US010582120B2

(12) United States Patent
Nayar et al.

(10) Patent No.: US 10,582,120 B2
(45) Date of Patent: Mar. 3, 2020

(54) SYSTEMS, METHODS, AND MEDIA FOR PROVIDING INTERACTIVE REFOCUSING IN IMAGES

(71) Applicant: The Trustees of Columbia University in the City of New York, New York, NY (US)

(72) Inventors: Shree K. Nayar, New York, NY (US); Daniel Miau, Bronx, NY (US); Changyin Zhou, Mountain View, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/220,625

(22) Filed: Dec. 14, 2018

(65) Prior Publication Data

US 2019/0141232 A1    May 9, 2019

Related U.S. Application Data

(63) Continuation of application No. 14/397,136, filed as application No. PCT/US2013/031773 on Mar. 14, 2013.

(Continued)

(51) Int. Cl.
*H04N 5/232* (2006.01)
*H04N 5/235* (2006.01)
(Continued)

(52) U.S. Cl.
CPC ..... *H04N 5/23229* (2013.01); *G02B 27/0075* (2013.01); *G02B 27/646* (2013.01);
(Continued)

(58) Field of Classification Search
CPC .......... H04N 5/23212; H04N 5/23216; H04N 5/23229; H04N 5/23254; H04N 5/23277;
(Continued)

(56) References Cited

U.S. PATENT DOCUMENTS

| 8,493,432 B2 | 7/2013 | Taguchi et al. |
| 8,593,564 B2 | 11/2013 | Border et al. |

(Continued)

FOREIGN PATENT DOCUMENTS

| JP | 2000-316120 | 11/2000 |
| JP | 2003-143461 | 5/2003 |

(Continued)

OTHER PUBLICATIONS

Adams, J.E., "A Fully Automatic Digital Camera Image Refocusing Algorithm", In Proceedings of the 10th Image, Video, and Multi-dimensional Signal Processing Workshop (IVMSP 11), Ithaca, NY, US, Jun. 16-17, 2011, pp. 81-86.

(Continued)

*Primary Examiner* — Lin Ye
*Assistant Examiner* — Chriss S Yoder, III
(74) *Attorney, Agent, or Firm* — Byrne Poh LLP

(57) ABSTRACT

Systems, methods, and media for providing interactive refocusing are provided, the systems comprising: a lens; an image sensor; and a processor that: causes the image sensor to capture a plurality of images over a predetermined period of time, wherein each of the plurality of images represents a scene at a different point in time; changes a depth of field between at least a pair of the plurality of images; concatenates the plurality of images to create a duration focal volume in the order in which the images were captured; computes a space-time in-focus image that represents in-focus portions from each of the plurality of images based on the duration focal volume; and computes a space-time index (Continued)

Duration Focal Volume map that identifies an in-focus image for each location of the scene from among the plurality of images based on the duration focal volume and the space-time in-focus image.

20 Claims, 14 Drawing Sheets

Related U.S. Application Data

(60) Provisional application No. 61/638,974, filed on Apr. 26, 2012.

(51) Int. Cl.
*G02B 27/00* (2006.01)
*G06T 5/50* (2006.01)
*G02B 27/64* (2006.01)

(52) U.S. Cl.
CPC ............ *G06T 5/50* (2013.01); *H04N 5/2356* (2013.01); *H04N 5/23212* (2013.01); *H04N 5/23216* (2013.01); *G06T 2200/21* (2013.01); *G06T 2207/10016* (2013.01); *G06T 2207/10024* (2013.01); *G06T 2207/10148* (2013.01); *G06T 2207/20016* (2013.01)

(58) Field of Classification Search
CPC .... H04N 5/2356; H04N 13/0282; G06T 5/50; G06T 2200/21; G06T 2207/10016; G06T 2207/10024; G06T 2207/20052; G06T 2207/10148; G06T 2207/20016; G02B 27/0075; G02B 27/646
See application file for complete search history.

(56) References Cited

U.S. PATENT DOCUMENTS

| | | | |
|---|---|---|---|
| 9,596,412 B2* | 3/2017 | Lee | H04N 5/23293 |
| 2003/0103670 A1 | 6/2003 | Schoelkopf et al. | |
| 2005/0041113 A1 | 2/2005 | Nayar et al. | |
| 2006/0198623 A1 | 9/2006 | Ono | |
| 2008/0131019 A1* | 6/2008 | Ng | G06T 5/50 |
| | | | 382/255 |
| 2010/0265346 A1 | 10/2010 | Iizuka | |
| 2010/0283868 A1 | 11/2010 | Clark et al. | |
| 2011/0261252 A1 | 10/2011 | Chen | |
| 2012/0056982 A1 | 3/2012 | Katz et al. | |
| 2012/0069235 A1* | 3/2012 | Imai | H04N 5/23212 |
| | | | 348/333.11 |
| 2012/0070097 A1 | 3/2012 | Adams, Jr. | |
| 2012/0249550 A1 | 10/2012 | Akeley et al. | |
| 2013/0044254 A1 | 2/2013 | Tzur | |
| 2014/0013273 A1* | 1/2014 | Ng | G06T 5/50 |
| | | | 715/802 |

FOREIGN PATENT DOCUMENTS

| | | |
|---|---|---|
| JP | 2010-128018 | 6/2010 |
| WO | WO2009120718 | 10/2009 |
| WO | WO2013162747 | 10/2013 |

OTHER PUBLICATIONS

Agarwala, A. et al., "Interactive Digital Photomontage", In ACM Transactions on Graphics , vol. 23, No. 3, Aug. 2004, pp. 294-302.
Boykov, Y. and Kolmogorov, V., "An Experimental Comparison of Min-Cut/Max-Flow Algorithms for Energy Minimization in Vision", In IEEE Transactions on Pattern Analysis and Machine Intelligence, vol. 26, No. 9, Sep. 2004, pp. 1124-1137.
Castro, A. and Ojeda-Castaneda, J., "Asymmetric Phase Masks for Extended Depth of Field", In Applied Optics, vol. 43, No. 17, Jun. 2004, pp. 3474-3479.
Cossairt, O. and Nayar, S., "Spectral Focal Sweep: Extended Depth of Field from Chromatic Aberrations", In International Conference on Computational Photography, Cambridge, MA, US, Mar. 29-30, 2010, pp. 1-8.
Cossiart, O. et al., "Diffusion Coded Photography for Extended Depth of Field", In Proceedings of the 37th International Conference and Exhibition on Computer Graphics and Interactive Techniques (SIGGRAPH '10), Los Angeles, CA, US, Jul. 25-29, 2010, pp. 1-10.
Dowski, E. and Cathey, W., "Extended Depth of Field Through Wave-Front Coding", In Applied Optics, vol. 34, No. 11, Apr. 1995, pp. 1859-1866.
Durand, F. and Freeman, B., "Refocusing and Light Field Lecture", Technical Report, 2006, pp. 1-81, available at: http://groups.csail.mit.edu/graphics/classes/CompPhoto06/html/lecturenotes/25_LightField.pdf.
George, N. and Chi, W., "Extended Depth of Field Using a Logarithmic Asphere," In Journal of Optics A: Pure and Applied Optics, vol. 5, No. 5, Aug. 2003, pp. 157-163.
Georgeiv, T. et al., "Spatio-Angular Resolution Tradeoff in Integral Photography", In Proceedings of the 17th Eurographics Conference on Rendering Techniques, Jun. 2006, pp. 263-272.
Georgiev, T. and Intwala, C., "Light Field Camera Design for Integral View Photography", Adobe Technical Report, 2006, pp. 1-13.
Gortler, S. et al., "The Lumigraph", In Proceedings of the 23rd Annual Conference on Computer Graphics and Interactive Techniques, Aug. 1996, pp. 43-54.
Guichard, F. et al., "Extended Depth-of-Field using Sharpness Transport across Color Channels", Technical Paper, DXO Labs, Jan. 2009, pp. 1-13.
Hasinoff, S. and Kutulakos, K., "Light-Efficient Photography", In IEEE Pattern Analysis and Machine Intelligence, vol. 33, No. 11, Nov. 2011, pp. 1-12.
Hasinoff, S. et al., "Time-Constrained Photography", In IEEE International Conference on Computer Vision, Kyoto, JP, Sep. 29-Oct. 2, 2009, pp. 333-340.
Hausler, G., "A Method to Increase the Depth of Focus by Two Step Image Processing", In Journal for Optics Communications, vol. 6, No. 1, Sep. 1972, pp. 38-42.
Indebetouw, G. and Bai, H., "Imaging with Fresnel Zone Pupil Masks: Extended Depth of Field", In Applied Optics, vol. 23, No. 23, Dec. 1984, pp. 4299-4302.
International Preliminary Report on Patentability dated Oct. 28, 2014 in International Patent Application No. PCT/US2013/031773.
International Search Report and Written Opinion dated Jul. 10, 2013 in International Patent Application No. PCT/US2013/031773.
Ives, H., "Parallax Panoramagrams made with a Large Diameter Lens", In the Journal of the Optical Society of America, vol. 20, No. 6, Jun. 1930, pp. 332-340.
Kuthirummal, S. et al., "Flexible Depth of Field Photography", In IEEE Transactions on Pattern Analysis and Machine Intelligence (PAMI '10), vol. 99, Mar. 2010, pp. 58-71.
Kutulakos, L. and Hasinoff, S., "Focal Stack Photography: High-Performance Photography with a Conventional Camera", In Proceedings of the 11th IAPR Conference on Machine Vision Applications, Yokohama, JP, May 20-22, 2009, pp. 332-337.
Levin, A., et al., "Image and Depth from a Conventional Camera with a Coded Aperture", in ACM Transactions on Graphics (TOG)—Proceedings of ACM SIGGRAPH '—07, vol. 26, No. 3, Jul. 2007, pp. 1-9.
Levoy, M. and Hanrahan, P., "Light Field Rendering", In Proceedings of the 23rd Annual Conference on Computer Graphics (SIGGRAPH '96), New Orleans, LA, US, Aug. 4-9, 1996, pp. 31-42.
Levoy, M. et al., "Light Field Microscopy", In ACM Transactions on Graphics, vol. 25, No. 3, Jul. 2006, pp. 924-934.
McNally, J. et al., "Three Dimensional Imaging by Deconvolution Microscopy", In Methods, vol. 19, No. 3, Nov. 1999, pp. 373-385.
Mouroulis, P., "Depth of Field Extension with Spherical Optics", In Optics Express, vol. 16, No. 17, Aug. 2008, pp. 12995-13004.
Nagahara, H. et al., "Flexible Depth of Field Photography", In European Conference on Computer Vision, Oct. 2008, pp. 60-73.

(56) References Cited

OTHER PUBLICATIONS

Nayar, S. and Nakagawa, Y., "Shape from Focus: an Effective Approach for Rough Surfaces", In Proceedings of the IEEE International Conference on Robotics and Automation, Cincinnati, OH, US, May 13-18, 1990, pp. 218-225.

Nayar, S. et al., "Real-Time Focus Range Sensor", In IEEE Transactions on Pattern Analysis and Machine Intelligence (Pami '96), vol. 18, no. 12, Dec. 1996, pp. 1186-1198.

Ng, R. et al., "Light Field Photography with a Hand-Held Plenoptic Camera", In Stanford Computer Science Technical Report, Apr. 2005, pp. 1-11.

Ng, R., "Digital Light Field Photography", PhD Dissertation, Department of Computer Science, Stanford University, Jul. 2006, pp. 1-203.

Office Action dated Apr. 7, 2017 in U.S. Appl. No. 14/397,136.

Office Action dated May 2, 2017 in JP Patent Application No. 2015-508963.

Office Action dated May 29, 2017 in EP Patent Application No. 13781144.4.

Office Action dated Jul. 19, 2017 in CN Patent Application No. 201380031831.9.

Pentland, A., "A New Sense for Depth of Field", In IEEE Pattern Analysis and Machine Intelligence, vol. 4, Jul. 1987, pp. 523-531.

Perona, P. And Malik, J., "Scale-Space and Edge Detection using Anisotropic Diffusion", In IEEE Transactions on Pattern Analysis and Machine Intelligence (PAMI '90), vol. 12, No. 7, Jul. 1990, pp. 629-639.

Poon, T. and Motamedi, M., "Optical/Digital Incoherent Image Processing for Extended Depth of Field", In Applied Optics, vol. 26, No. 21, Nov. 1987, pp. 4612-4615.

Rajagopalan, A. and Chaudhuri, S., "Optimal Selection of Camera Parameters for Recovery of Depth from Defocused Images", In IEEE Computer Society Conference on Computer Vision and Pattern Recognition, San Juan, PR, Jun. 17-19, 1997, pp. 219-224.

Ren, H. and Wu, S., "Variable-Focus Liquid Lens", In Opt Express, vol. 15, No. 10, May 2007, pp. 5931-5936.

Ren, H. et al., "Tunable-Focus Liquid Lens Controlled using a Servo Motor" In Opt Express, vol. 14, No. 18, Sep. 2006, pp. 8031-8036.

Restriction Requirement dated Jul. 1, 2016 in U.S. Appl. No. 14/397,136.

Sibarita, J., "Deconvolution Microscopy", In Microscopy Techniques, Springer-Verlag Berlin Heidelberg, 2005, pp. 201-243.

Subbarao, M. and Tyan, J., "Selecting the Optimal Focus Measure for Autofocusing and Depth-from-Focus", In IEEE Transactions on Pattern Analysis and Machine Intelligence (PAMI '98), vol. 20, No. 8, Aug. 1998, pp. 864-870.

Supplementary European Search Report dated Mar. 9, 2016 in European Patent Application No. 13781144.4.

Tao, H. et al., "A Global Matching Framework for Stereo Computation", In Proceedings of the Eight IEEE International Conference on Computer Vision, vol. 1, Jul. 2001, pp. 532-539.

Wilburn, B. et al., "High Performance Imaging using Large Camera Arrays" In ACM Transactions on Graphics, vol. 24, No. 3, Jul. 2005, pp. 765-776.

Xiong, Y. and Shafer, S., "Depth from Focusing and Defocusing", In Proceedings of IEEE Computer Society Conference on Computer Vision and Pattern Recognition (CVPR '93), New York, NY, US, Jun. 15-17, 1993, pp. 68-73.

Yedidia, J. et al., "Generalized Belief Propagation", In Advances in Neural Information Processing Systems (NIPS '01), Vancouver, British Columbia, CA, Dec. 3-8, 2001, pp. 689-695.

Zhou, C. et al., "Coded Aperture Pairs for Depth from Defocus", In IEEE International Conference on Computer Vision, Kyoto, JP, Sep. 29-Oct. 2, 2009, pp. 325-332.

Zhou, C., et al., "Focal Sweep Camera for Space-Time Refocusing", Columbia University Technical Report CUCS-021-12-2012, Apr. 24, 2012, pp. 1-11.

\* cited by examiner

Duration Focal Volume

Space-Time In-Focus Image

Space-Time Index Map

SYSTEMS, METHODS, AND MEDIA FOR PROVIDING INTERACTIVE REFOCUSING IN IMAGES

CROSS-REFERENCE TO RELATED APPLICATION

This application is a continuation of U.S. patent application Ser. No. 14/397,136, filed Oct. 24, 2014, which is a National Stage Entry of International Patent Application No. PCT/US2013/031773, filed Mar. 14, 2013, which claims the benefit of U.S. Provisional Patent Application No. 61/638,974, filed Apr. 26, 2012, which are hereby incorporated by reference herein in their entireties.

STATEMENT REGARDING FEDERALLY SPONSORED RESEARCH OR DEVELOPMENT

This invention was made with government support under grant N00014-08-1-0929 awarded by the Office of Naval Research. The Government has certain rights in this invention.

TECHNICAL FIELD

The disclosed subject matter relates to systems, methods, and media for providing interactive refocusing in images.

BACKGROUND

The depth of field (DOF) of an image is a range of scene depths at which objects in a scene appear to be in-focus in an image of the scene. In most applications of imaging, from consumer digital photography to optical microscopy, it is desirable to control the DOF of an image being captured. Capturing images with a very large DOF is particularly appealing given that, as the depth of field increases, more of the scene can be shown in focus. However, some conventional techniques for increasing depth of field, such as decreasing the aperture of a camera, have limitations. For example, with a smaller aperture, less light is received at an image sensor (or film), and this can require longer exposures which can decrease the signal to noise ratio and cause blurring due to camera shake and/or objects in the scene moving. Furthermore, as pixel size decreases (and/or as sensor resolution increases), the DOF of an image decreases because any defocus blur present in the image occupies a greater number of pixels. At the same time, each pixel receives less light which can cause the signal to noise ratio to fall as well. This trade-off between the DOF and the signal to noise ratio is one of the fundamental, long-standing limitations in imaging.

Two other limitations on DOFs in images are that: (1) many cameras can only capture a single limited DOF that corresponds to a single range in the scene; and (2) the DOF in an image is typically fixed and cannot be altered by a user after capturing an image. Because of this single, fixed DOF, only objects within the DOF are captured in-focus and objects in the scene outside of the DOF are blurred to some extent. This can inhibit, for example, a user from capturing an image where an object that is close to the camera (e.g., inches to a few feet away) and objects that are far from the camera (e.g., several feet to dozens of feet away) are both in-focus, forcing the user to choose which object to capture in an in-focus state.

Therefore, there is a need for mechanisms that can provide interactive refocusing in images over multiple depths of field and can provide images with an extended depth of field.

SUMMARY

In accordance with various embodiments of the disclosed subject matter, systems, methods, and media for providing interactive refocusing in images are provided.

In accordance with some embodiments of the disclosed subject matter, systems for providing interactive refocusing in images are provided, the systems comprising: a lens; an image sensor; and a hardware processor configured to: causes the image sensor to capture a plurality of images over a predetermined period of time, wherein each of the plurality of images represents a scene at a different point in time; changes a depth of field between at least a pair of the plurality of images; concatenates the plurality of images to create a duration focal volume in the order in which the images were captured; computes a space-time in-focus image that represents in-focus portions from each of the plurality of images based on the duration focal volume; and computes a space-time index map that identifies an in-focus image for each location of the scene from among the plurality of images based on the duration focal volume and the space-time in-focus image.

In accordance with some embodiments of the disclosed subject matter, methods for providing interactive refocusing are provided, the methods comprising: causing, using a hardware processor, a plurality of images to be captured over a predetermined period of time, wherein each of the plurality of images represents a scene at a different point in time; causing a depth of field at which the plurality of images are captured to be changed between at least a pair of the plurality of images; create a duration focal volume by concatenating the plurality of images in the order in which the images were captured; computing a space-time in-focus image that represents in-focus portions from each of the plurality of images based on the duration focal volume; and computing a space-time index map that identifies an in-focus image for each location of the scene from among the plurality of images based on the duration focal volume and the space-time in-focus image.

In accordance with some embodiments of the disclosed subject matter, non-transitory computer readable media containing computer executable instructions that, when executed by a processor, cause the processor to perform a method for providing interactive refocusing are provided, the methods comprising: causing a plurality of images to be captured over a predetermined period of time, wherein each of the plurality of images represents a scene at a different point in time; causing a depth of field at which the plurality of images are captured to be changed between at least a pair of the plurality of images; create a duration focal volume by concatenating the plurality of images in the order in which the images were captured; computing a space-time in-focus image that represents in-focus portions from each of the plurality of images based on the duration focal volume; and computing a space-time index map that identifies an in-focus image for each location of the scene from among the plurality of images based on the duration focal volume and the space-time in-focus image.

In accordance with some embodiments of the disclosed subject matter, systems for providing interactive refocusing are provided, the systems comprising: a lens; an image sensor; means for causing the image sensor to capture a plurality of images over a predetermined period of time, wherein each of the plurality of images represents a scene at a different point in time; means for changing a depth of field between at least a pair of the plurality of images; means for concatenating the plurality of images to create a duration focal volume in the order in which the images were captured; means for computing a space-time in-focus image that represents in-focus portions from each of the plurality of images based on the duration focal volume; and means for computing a space-time index map that identifies an in-focus image for each location of the scene from among the plurality of images based on the duration focal volume and the space-time in-focus image.

In some embodiments, the means for changing the depth of field comprises means for changing a distance between the lens and the image sensor.

In some embodiments, the means for changing the distance between the lens and the image sensor comprises means for driving an actuator that causes the image sensor to move relative to the lens.

In some embodiments, the means for changing the distance between the lens and the image sensor comprises means for driving an actuator that causes the lens to move relative to the image sensor.

In some embodiments, the means for changing the depth of field comprises means for changing a focal length of the lens.

In some embodiments, the means for changing the depth of field comprises means for moving a second lens in an optical axis direction, wherein the second lens is disposed between the lens and the image sensor in the optical axis direction.

In some embodiments, for each of the plurality of images in the duration focal volume the depth of field of the image is substantially continuous with the depth of field for one or more adjacent images.

In some embodiments, the intersection of the depths of field for the plurality of images is an empty set.

In some embodiments, the system further comprises means for causing the plurality of images to be captured at a predetermined frame rate.

In some embodiments, the system further comprises means for changing a distance between the lens and the image sensor at a constant rate based on at least one of the following parameters: the predetermined frame rate; a pixel size of the image sensor; and an f-number of the lens.

In accordance with some embodiments of the disclosed subject matter, systems for providing interactive refocusing are provided, the systems comprising: a hardware processor configured to: causes an image of a scene to be displayed to a user, wherein the image is representative of the scene represented in a duration focal volume that comprises a plurality of images captured of the scene at different points in time, and wherein the plurality of images are captured at a plurality of different depths of field; receives a selection of a point in the image by the user; causes a selected image from among the plurality of images to be displayed to the user, wherein the selected image is an image where an object in the scene at the point selected by the user is in focus.

In accordance with some embodiments of the disclosed subject matter, methods for providing interactive refocusing are provided, the methods comprising: causing an image of a scene to be displayed to a user, wherein the image is representative of the scene represented in a duration focal volume that comprises a plurality of images captured of the scene at different points in time, and wherein the plurality of images are captured at a plurality of different depths of field; receiving a selection of a point in the image by the user; causing a selected image from among the plurality of images to be displayed to the user, wherein the selected image is an image where an object in the scene at the point selected by the user is in focus.

In accordance with some embodiments of the disclosed subject matter, non-transitory computer readable medium containing computer executable instructions that, when executed by a processor, cause the processor to perform methods for providing interactive refocusing are provided, the methods comprising: causing an image of a scene to be displayed to a user, wherein the image is representative of the scene represented in a duration focal volume that comprises a plurality of images captured of the scene at different points in time, and wherein the plurality of images are captured at a plurality of different depths of field; receiving a selection of a point in the image by the user; causing a selected image from among the plurality of images to be displayed to the user, wherein the selected image is an image where an object in the scene at the point selected by the user is in focus.

In accordance with some embodiments of the disclosed subject matter, methods for providing an interactive refocusing image are provided, the methods comprising: receiving, using a hardware processor, a plurality of images of a scene captured at different points in time, wherein each of the plurality of images represents a different depth of field of the scene; concatenating the plurality of images to create a duration focal volume in the order in which the images were captured; computing a space-time in-focus image that represents in-focus portions from each of the plurality of images based on the duration focal volume; and computing a space-time index map that identifies an in-focus image for each location of the scene from among the plurality of images based on the duration focal volume and the space-time in-focus image.

In accordance with some embodiments of the disclosed subject matter, methods for providing an interactive refocusing image, the method comprising: receiving, using a hardware processor, a plurality of images of a scene captured at different points in time, wherein each of the plurality of images represents a different depth of field of the scene; concatenating the plurality of images to create a duration focal volume in the order in which the images were captured; and for each point $(x,y,P_0)$ in the duration focal volume: (a) setting a point P in the duration focal volume equal to $P_0$, (b) selecting a cone centered at P; (c) finding a point Q in the cone at which a measure of focus is highest; (d) determining whether Q equals P; (e) repeating (b) through (d) until it is determined that Q equals P; and (f) setting a depth for point $(x,y, P_0)$ equal to Q.

In accordance with some embodiments of the disclosed subject matter, methods for providing an interactive refocusing image are provided, the methods comprising: receiving, using a hardware processor, a plurality of images of a scene captured at different points in time, wherein each of the plurality of images represents a different depth of field of the scene; concatenating the plurality of images to create a duration focal volume in the order in which the images were captured; determining an optical flow between each pair of successive images; determining a pixel trajectory through the duration focal volume for each pixel location in the scene; determining an in-focus point for each pixel by determining a point along the pixel trajectory where a measure of focus for the pixel is highest; and computing a space-time index map that identifies an in-focus image for each pixel of the scene from among the plurality of images based the in-focus point for each pixel.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
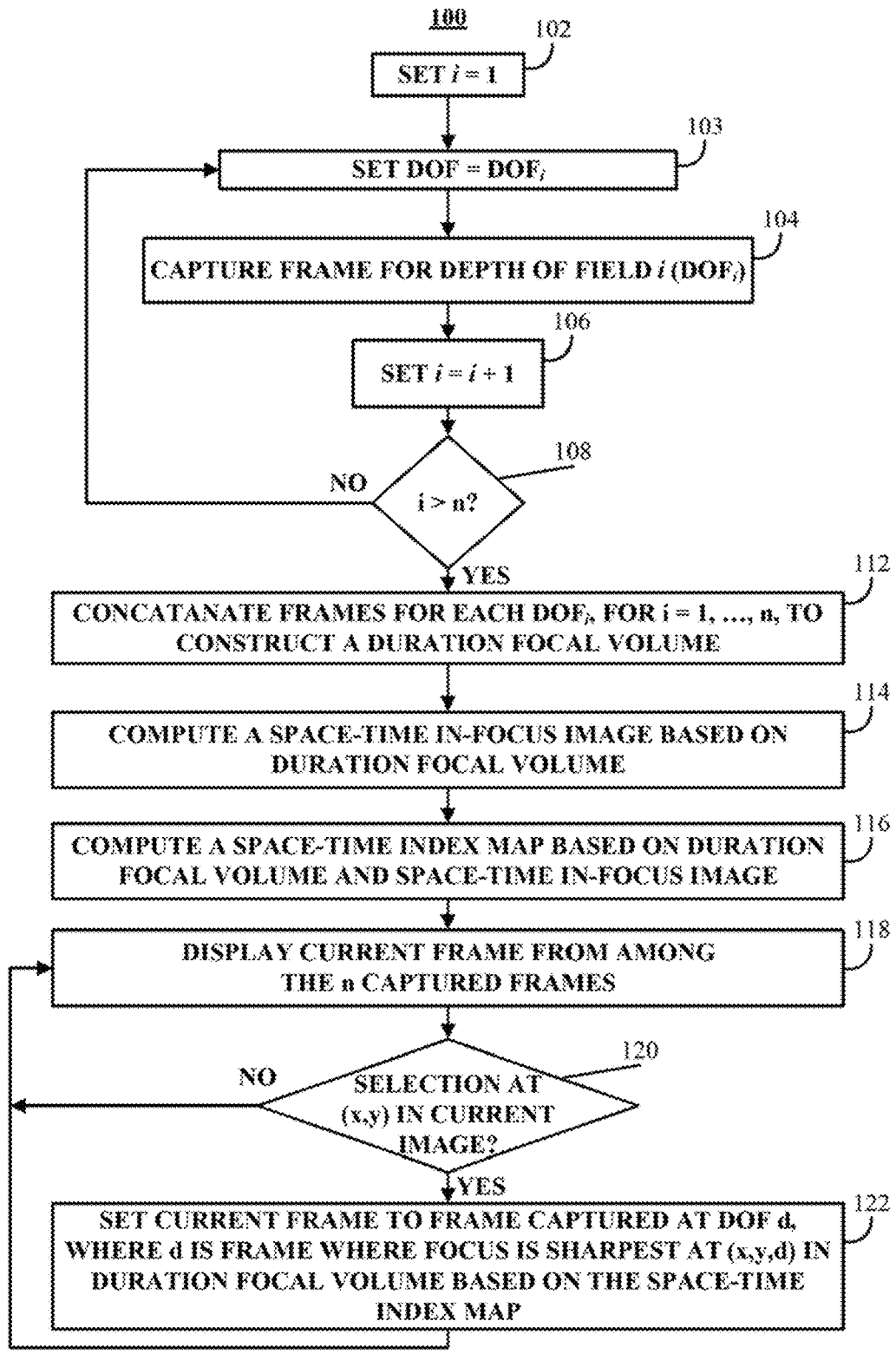
FIG. 1 shows an example of a process for providing interactive refocusing in images in accordance with some embodiments of the disclosed subject matter.

In accordance with various embodiments, mechanisms for providing interactive refocusing in images are provided. In accordance with some embodiments, images of a scene can be captured at various depths of field over a predetermined amount of time. These images can then be concatenated in time and analyzed to facilitate refocusing on any point selected in an image of the scene. For example, an image sensor of a camera can be moved relative to a lens of the camera to alter the depth of field. As the sensor is moving, images of a scene can be captured with different depths of field. The various images can be concatenated in time to form a duration focal volume that represents the scene over different depths of field at different times. In general, a duration focal volume can represent a scene such that different depths in the duration focal volume represent a point in the scene at different points in time and at different depths of field. In this way, the duration focal volume can be considered a three-dimensional representation of a scene. In one particular example, a duration focal volume can be represented by a stack of two-dimensional images of the scene that collectively make up a volume having two spatial dimensions and one time dimension.

In some embodiments, points in the scene can be evaluated over the duration focal volume to determine an image in the stack in which a given point is in its sharpest focus. This can allow portions of the scene that are close to a camera to be captured in an in-focus state in one image, and portions of the scene that are farther from the camera to be captured in an in-focus state in another image. Such in-focus portions captured in different images can be used in the mechanisms described herein to provide interactive refocusing in captured images, among other things. Additionally, because objects in the scene can be moving during the predetermined amount of time, the image sequence can also capture motion of any moving objects, as the objects may appear in different positions in different images in the stack.

A processor can be provided for controlling camera focus sweep (e.g., by moving a sensor, a lens, etc.) in order to capture a three-dimensional space-time volume that includes depths of field that correspond to each object in the scene. For example, this can allow for images to be captured so that each object in a scene represented in the images is in an in-focus state in at least one of the images.

Techniques for recovering in-focus images and in-focus index maps, which can be used for interactive refocusing, can also be provided. Because objects in a scene may change positions from two-dimensional image to two-dimensional image, a three-dimensional index map that is layer-dependent can also be provided. In particular, the index at any particular layer (e.g., a two-dimensional image) of the three-dimensional index map can depend on that layer as well as a two-dimensional position in the index map.

In some embodiments, a viewer can be used to facilitate interactive refocusing in images and for presenting information (e.g., focus information for one or more objects in a scene) from a duration focal volume captured using the mechanisms described herein. For example, an object in a scene can be refocused in a viewer when a user selects a point in an image displayed using the viewer (e.g., when a user "clicks" on a point in an image) by using a pre-computed in-focus index map calculated using the mechanisms described herein. In some embodiments, this viewer can include effects of object motion with refocusing. For example, in response to a selection of a point in an image by a user, the viewer can bring a selected object(s) into focus, and at the same time, show its/their motion(s). This integration can yield a unique and appealing user experience.

Alternatively, rather than using a pre-computed in-focus index map, similar techniques can be used to calculate an in-focus index at a time when a user selects a point in an image presented using a viewer without pre-computing (e.g., the computation of an in-focus index can be performed at the time of user selection of a point, rather than using a pre-computed in-focus index map).

Turning to FIG. 1, an example 100 of a process for providing interactive refocusing in images is shown in accordance with some embodiments of the disclosed subject matter. As described further below, through process 100, a series of images can be captured with different depths of field. Each image can be a frame captured by an image sensor. These various frames (or images) can be concatenated in time to create a duration focal volume. An index i can be used to indicate the position of each frame within the duration focal volume and/or can be used to identify a depth of field captured in each frame.

At 102, process 100 can begin by setting an index i equal to one, where i can indicate a frame number and/or a depth of field to be captured in the next frame. At 103, a depth of field (DOF) for capturing a frame i can be set to depth of field i ($DOF_i$).

At 104, a frame corresponding to index i can be captured for depth of field i ($DOF_i$). In some embodiments, this frame can then be stored in memory while other frames are captured that correspond to other depths of field.

At 106, index i can be set to i plus one and at 108 it can be determined whether index i has exceeded a total number of frames to be captured n. In some embodiments, the number of frames n to be captured can be set to a number of frames expected to allow for objects at most depths in a scene to be refocused by a user with sharpness above a threshold. Any suitable number of frames can be captured in some embodiments. For example, n can be set to 30 such that frames are captured at 30 depths of field that cover a range of distances from a lens of the camera. As another example, n can be set to capture fewer frames (e.g., ten frames, fifteen frames, etc.) in cases where there is limited depth in the scene, such as a scene captured indoors. As yet another example, n can be set to a capture more frames (e.g., 45 frames, 60 frames, 100 frames, etc.), where the depth of field captured in each frame is reduced because, for example, the pixel size is smaller, the focal length is longer, etc.

Any suitable range of depths of field can be captured in some embodiments. For example, if a scene being captured includes a closest object in the scene at a distance R1 from the camera, and a farthest object at a distance R2 from the camera, the depths of field captured can include depths of field from R1 to R2, and depths of field from zero to R1 and from R2 to infinity can be omitted. In some embodiments, the number of DOFs captured can include enough DOFs such that any object in the scene is included in at least one DOF, as described below in connection with, for example, FIGS. 11 and 12.

In some embodiments, the depth of field can be changed between captured frames such that the depth of field captured in each frame does not substantially overlap with the depth of field captured in any other frame as described below in connection with, for example, FIGS. 11 and 12.

If index i is less than n ("NO" at 108), process 100 can return to 103 and the depth of field can be set to $DOF_i$ (where i has been incremented). Otherwise, if index i is greater than n ("YES" at 108), process 100 can proceed to 112.

In some embodiments, as described above and in more detail below in connection with FIGS. 11 and 12, the DOF can be set such that the outer distance (e.g., $Z_{max}$) of $DOF_m$ is equal to the inner distance (e.g., $Z_{min}$) of $DOF_{m+1}$. For example, a maximum distance $Z_{max}$ for a first depth of field $DOF_1$ can be set equal to a minimum distance $Z_{min}$ for a second depth of field $DOF_2$. As described above, any suitable technique or combination of techniques can be used to change the DOF between captured frames.

In some embodiments, the images can be captured at a frame rate of an imager or some fraction of the frame rate. For example, if a camera being used to capture images has a frame rate of 120 frames per second, and it takes a tenth of a second to change from $DOF_i$ to $DOF_{i+1}$, frames can be captured at ten frames per second. In such an example, if any frames are captured while a depth of field is being changed (e.g., in the example 110 of the 120 frames are captured while the depth of field is being changed), such frames can be stored in memory temporarily, discarded, stored for any suitable purpose, etc.

At 112, process 100 can concatenate the frames for each DOF captured at different times to construct a duration focal volume. In some embodiments, the frames (e.g., images) captured at the different DOFs can be concatenated in order of the time that the frames were captured such that a first captured frame is placed first, and a last captured frame is placed last, with frames in between ordered according to the index of the frame.

Figure 2:
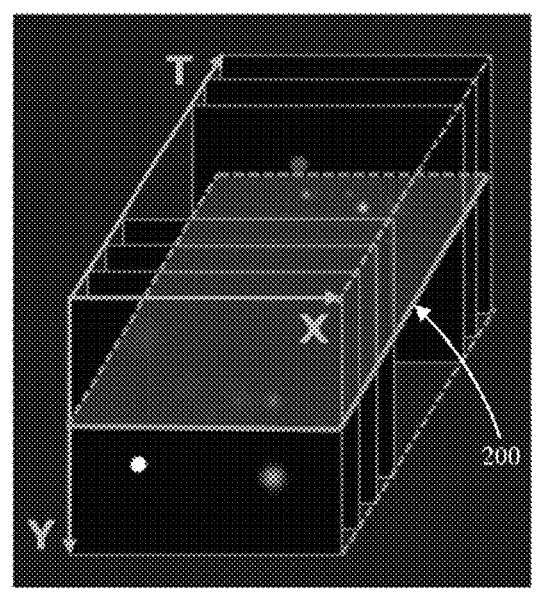
FIG. 2 shows an example of a duration focal volume of images captured in accordance with some embodiments of the disclosed subject matter.
Figure 3:
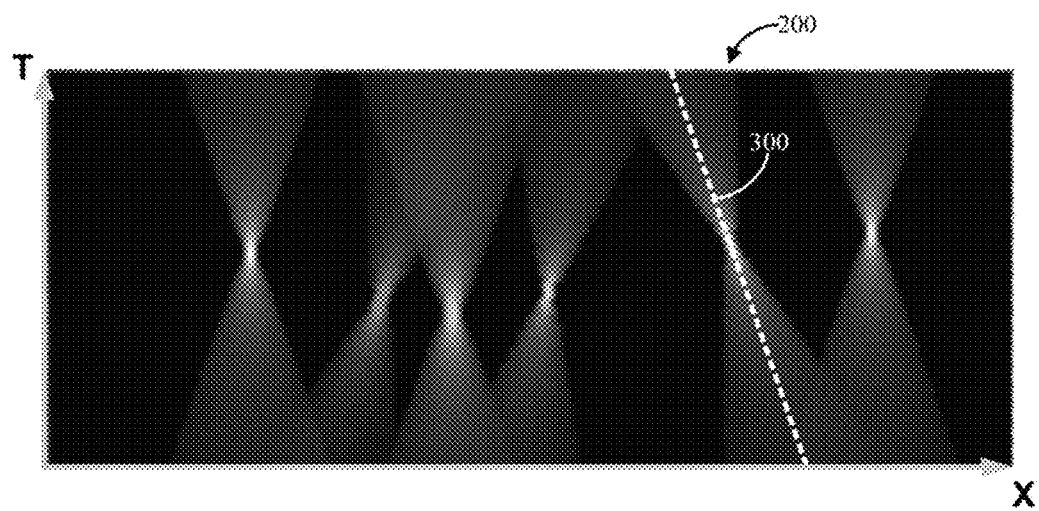
FIG. 3 shows an example of a horizontal slice of a duration focal volume in accordance with some embodiments of the disclosed subject matter.

FIG. 2 shows an example of a three-dimensional duration focal volume (having two space dimensions X and Y, and one time dimension T) of a scene that includes moving balls. Each non-occluded scene point in the focus range can be captured in focus at least once. FIG. 3 shows an example of a longitudinal slice 200 taken from the duration focal volume of FIG. 2. Slice 200 is an X-dimension-by-T-dimension slice of the duration focal volume, and shows that each ball in the scene captured by the duration focal volume can appear as a cone. The shapes of the cones can be determined by a lens profile and the speed of focus sweep. For example, as an object becomes less focused, the radius of the cone can become larger. Additionally, points at which the cone narrows before re-expanding can indicate points where the object is in sharpest focus. In some cases, the cones can be sheared (e.g., have an axis (e.g., axis 300) that is at an angle from straight up and down in the T direction) due to objects in the scene moving while images that make up the duration focal volume were captured. It should be noted that it is possible that a moving object can be in focus in more than one image depending on the objects' speed and direction of movement. If such an object were present in the example of FIG. 3, its shape as shown in slice 200 may be different than the cones shown in FIG. 3.

Figure 5:
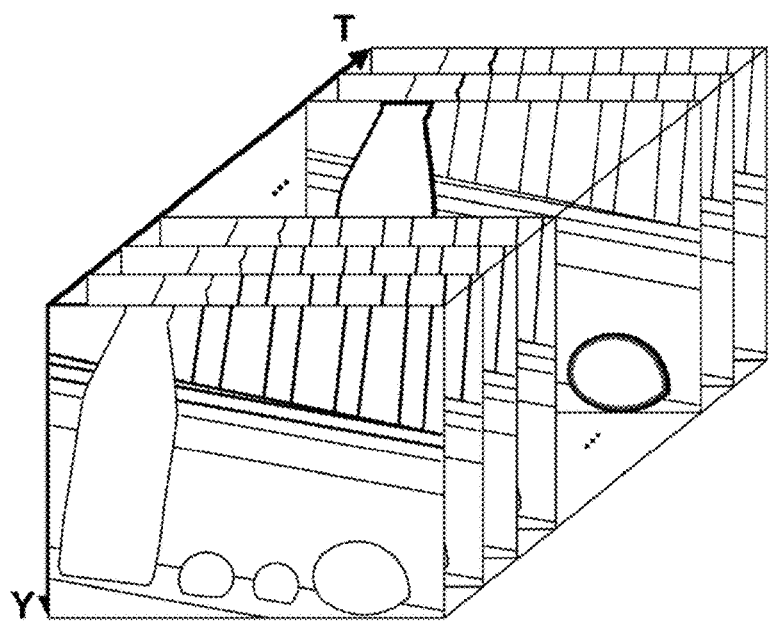
FIG. 5 shows an example of another duration focal volume of images captured in accordance with some embodiments of the disclosed subject matter.

FIG. 5 shows another example of a duration focal volume for a scene captured using a focal sweep where there are objects in the foreground, different objects in the background, and a set of stairs in between. In the example shown in FIG. 5, in frames captured near time zero (e.g., where the time axis T intersects with the X axis and Y axis in the example), objects in the foreground can be more in-focus and objects in the background can be less in-focus; and, in the frames captured farthest from time zero, objects in the background can be more in-focus and the objects in the foreground can be less in-focus.

Returning to FIG. 1, the duration focal volume can be used at 114 to compute a space-time in-focus image. In some embodiments, the space-time in-focus image can be a space-time all-in-focus image computed from the duration focal volume. For example, in some cases, the space-time in-focus image can be an extended depth of field image. In some embodiments, sharpness information from each layer can be used to compute an image that includes the sharpest image portions for each point of the scene. This can provide an image wherein, at each point of a scene, information for that point is derived from the sharpest frame for that particular point. In some embodiments, a weighted sum for each point averaged over the time axis can be used to calculate the space-time in-focus image, as described below in connection with FIG. 15.

Figure 4:
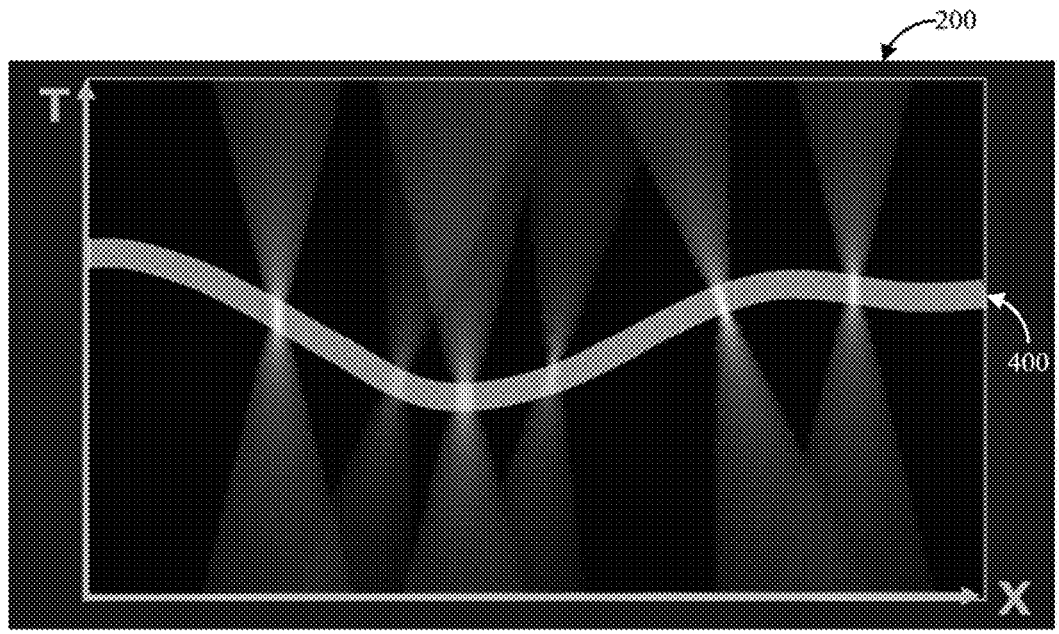
FIG. 4 shows an example of a horizontal slice of a duration focal volume showing an example of a portion of a space-time in-focus image in accordance with some embodiments of the disclosed subject matter.

FIG. 4 shows an example of an in-focus line 400 of a slice 200 in the X-T plane of the duration focal volume shown in the example of FIG. 2. As can be seen in FIG. 4, the layers in the time axis where the objects are at their sharpest focus can be used to construct the space-time in-focus image. Extended to three dimensions, the space-time in-focus image can be a surface in the duration focal volume wherein points on the surface represent the sharpest layer at each point in the scene over the duration focal volume. More particularly, there can be an in-focus line similar to in-focus line 400 for each slice in the X-T plane. A space-time in-focus image can be a combination of these space-time in-focus lines, with a line (e.g., line 400) from each slice in the X-T plane (e.g., slice 200) representing a row in the space-time in-focus image (e.g., a row at the same value of Y as slice 200).

Figure 6:
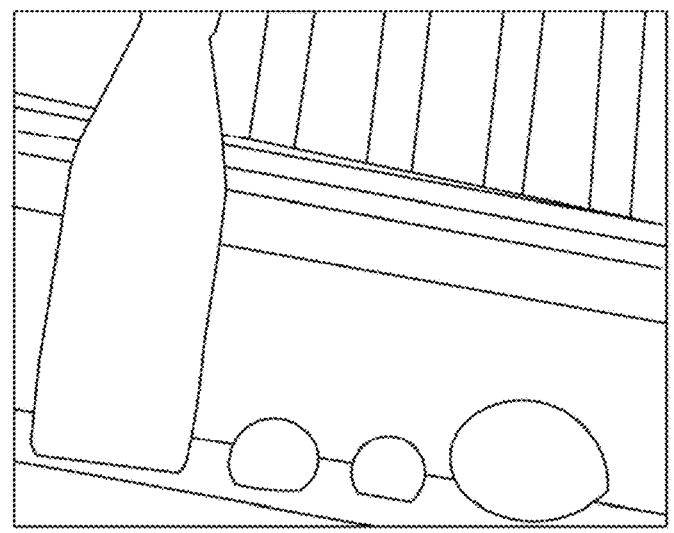
FIG. 6 shows an example of a space-time in-focus image in accordance with some embodiments of the disclosed subject matter.

FIG. 6 shows an example of a space-time in-focus image for the duration focal volume shown in the example of FIG. 5. The space-time in-focus image of FIG. 6 can be computed as described below in connection with FIG. 15.

Figure 7:
FIG. 7 shows an example of a space-time index map in accordance with some embodiments of the disclosed subject matter.

Returning to FIG. 1, process 100 can proceed to 116 at which a space-time index map can be computed based on the duration focal volume and the space-time in-focus image. The space-time in-focus index map can represent the layer at which each point in the scene is sharpest. In some embodiments, the space-time in-focus index map can be used to determine which frame to display in response to selection of a point in the scene. FIG. 7 shows an example of a space-time index map for the duration focal volume shown in the example of FIG. 5. In some embodiments, a space-time index map can be a grayscale image where the value at each pixel is based on the index i of the duration focal volume at which a measure of focus (note that any suitable measure of focus can be used) is maximized. In the example of FIG. 7 higher values (e.g., darker pixels) correspond to layers where the depth of field is closer to the camera.

Figure 8:
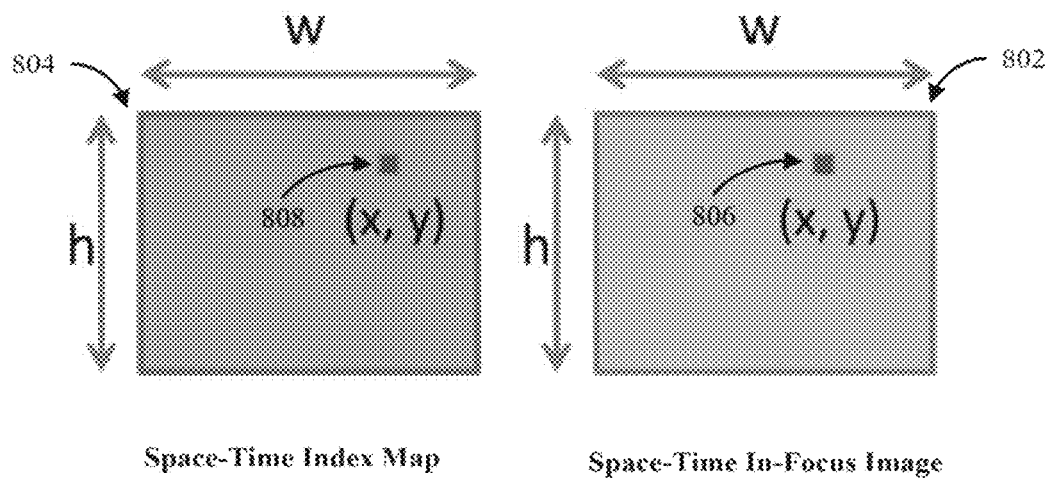
FIG. 8 shows an example of a space-time index map and a corresponding space-time in-focus image in accordance with some embodiments of the disclosed subject matter.

In some embodiments, when a scene imaged using the mechanisms described herein is static (e.g., objects in the scene do not move more than a threshold amount from the first frame to the last frame), a single space-time index map can be computed for the entire duration focal volume. FIG. 8 shows an example of a space-time in-focus image 802 and a corresponding space-time index map 804. In the example of FIG. 8, each point (x,y) 806 in space-time in-focus image 802 corresponds to a depth value at the point (x,y) 808 in space-time index map 804.

Figure 9:
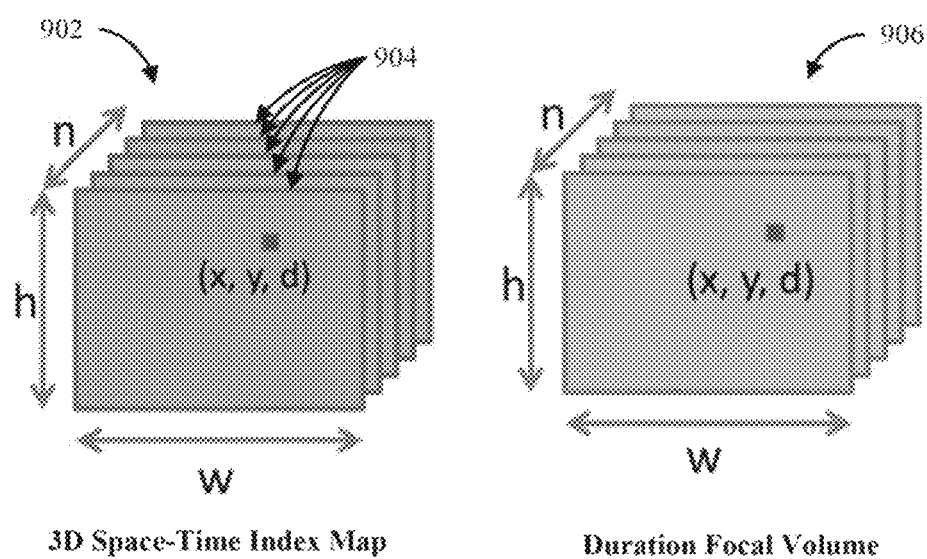
FIG. 9 shows an example of a three-dimensional space-time index map and a corresponding duration focal volume in accordance with some embodiments of the disclosed subject matter.

In some embodiments, when a scene imaged using the mechanisms described herein is dynamic (e.g., one or more objects in the scene move more than a threshold amount from the first frame to the last frame), a three-dimensional space-time index map can be computed to yield a three-dimensional space-time index map stack. The three-dimensional space-time index map stack can contain a two-dimensional index map corresponding to each image in the duration focal volume. FIG. 9 shows an example of a three-dimensional index map 902 and a set of two-dimensional index maps 904 making up three-dimensional index map 902 for a dynamic scene (e.g., a scene with significant movement). Each two-dimensional index map 904 can be a grayscale image wherein the value at each point (x,y) in two-dimensional space-time index map 904 indicates a layer, d, at which the object at point (x,y) is in focus in a duration focal volume 906. For a moving object, a point (x,y) at which the object is located can change from one two-dimensional space-time index map to another. Therefore, the value at point (x,y) on one two-dimensional space-time index map may not be the same as the value at point (x,y) in another two-dimensional space-time index map.

In some embodiments, the value for each point in the space-time in-focus image can be compared to the value of the same point in each of the frames that make up the duration focal volume. The layer where the values most closely match can be set as the depth where that point in the scene is sharpest. Additionally or alternatively, patches of the space-time in-focus image can be compared to patches of the duration focal volume. For example, a normalized cross-correlation can be found between a patch of the space-time in-focus image and patches of each frame in the duration focal volume, and a match can be found where the normalized cross-correlation results in a greatest value. As another example, patches that are considered to be a given object or portion of an object (e.g., have a given pattern, color(s) or brightness(es), a combination of these, etc.) that include a location (x,y) in the space-time in-focus image can be found and compared to patches around the same location in other images in the duration focal volume. In such an example, a match can be found where the patches include substantially the same image data. An example of a process for finding a space-time index map based on comparison of a space-time in-focus image and a duration focal volume is described below in connection with FIGS. 16-19.

In some embodiments, a greedy search technique can be used to find a frame in a duration focal volume where a point $P_0$ in the scene is most likely to be sharpest. A depth, d, of the layer corresponding to the frame where $P_0$ is likely sharpest can be used in the space-time index map. An example of a process for computing a space-time index map based on a greedy search is described below in connection with FIG. 20.

In some embodiments, a machine learning process can be used to compute a space-time index map by finding a frame in a duration focal volume where a point $P_0$ in the scene is most likely to be sharpest. In the machine learning process, a set of duration focal volumes with known depths where each point of a scene is sharpest can be used to train a classification model. The classification model can be trained using points that are known to be in-focus points and points that are known to be out-of-focus points. The trained classification model can be used to find a space-time index map for a duration focal volume where the depth of the in-focus points are unknown. An example of a machine learning process for computing a space-time index map is described below in connection with FIG. 21.

In some embodiments, an optical flow analysis can be used to compute a space-time index map by finding a trajectory for each point through the duration focal volume and finding the sharpest point along the trajectory. An example of a process for computing a space-time index map using an optical flow analysis is described below in connection with FIG. 22.

Referring back to FIG. 1, at 118, an initial frame set as a current frame from among the n captured frames can be displayed to a user. In some embodiments, a frame that was captured first or last can be displayed to the user as the initial frame. Alternatively, the space-time in-focus image can be displayed to the user as the initial frame. In another alternative, any frame from among the frames that make up the duration focal volume can be displayed to the user as the initial frame.

At 120, it can be determined if there was a selection at a point (x,y) of the current frame. In some embodiments, a user can select a point (x,y) of the current frame to bring into focus. For example, a user can select a point (x,y) by using a cursor and clicking when the cursor is over the point (x,y) that the user wishes to select. Additionally or alternatively, a user can touch a point (x,y) that the user wishes to select on a touchscreen device displaying the current image. Additionally or alternatively, any suitable technique for selecting a point (x,y) to refocus on can be used in association with the mechanisms described herein.

If a point is not selected ("NO" at 120), process 100 can return to 118 and continue to display the current image.

Otherwise, if a point (x,y) in the current image is selected ("YES" at 120), at 122, the current frame can be changed to the frame in which focus is sharpest at a point corresponding to selected point (x,y) that was selected at 120. In some embodiments, the frame where focus is sharpest can be determined using the space-time index map. If the point (x,y) corresponds to an object that moves in the duration focal volume, the sharpest frame can be determined not only by the coordinates in the X and Y directions, but also based on the current frame that the point (x,y) was selected in. When the frame having the sharpest focus is determined, it can be set as a current frame and process 100 can return to 118 to display the newly set current frame.

In some embodiments, a subset of frames in the duration focal volume between the previously displayed frame from which point (x,y) was selected and the newly set current frame can be displayed sequentially between display of the previously displayed frame and the new current frame. This can allow for a smooth transition between the previous image and the current image that can simulate a manual focus operation as though a user were viewing a scene to be captured through a viewfinder.

Figure 10:
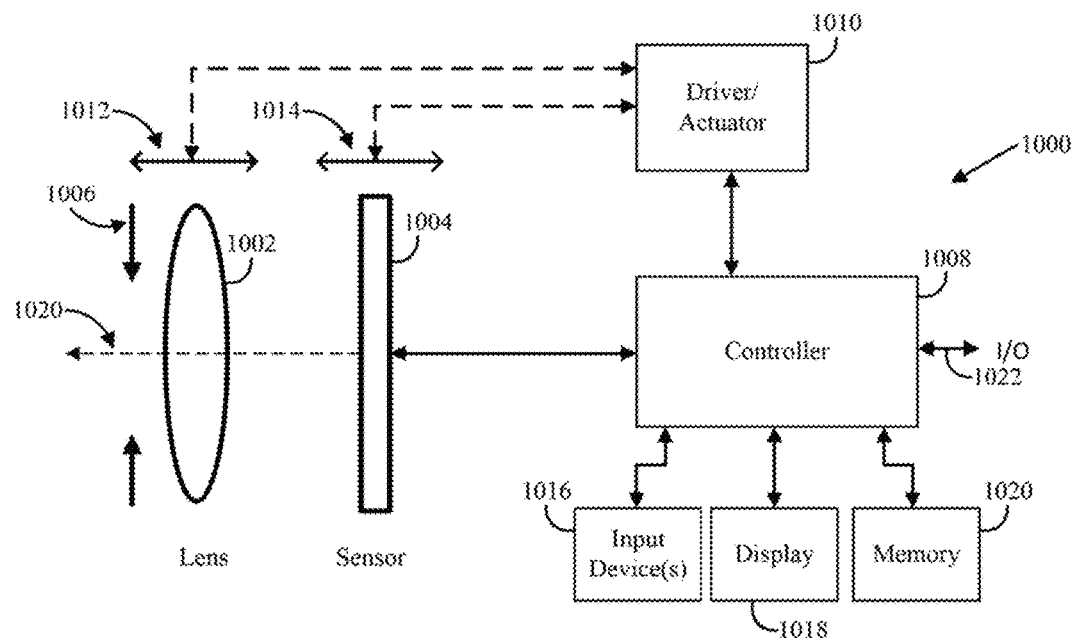
FIG. 10 shows an example of a camera that can be used to capture a duration focal volume in accordance with some embodiments of the disclosed subject matter.

Turning to FIG. 10, an example 1000 of a camera for capturing a duration focal volume for use with the mechanisms for providing refocusing in images as described herein in accordance with some embodiments is illustrated. As shown, camera 1000 can include: a lens 1002 for focusing an image on an image sensor 1004; an aperture stop 1006 (e.g., a diaphragm) for controlling an aperture of camera 1000 (e.g., how much light from a scene is allowed to impinge on image sensor 1004); a controller 1008 for controlling operations of camera 1000 which can be any suitable general purpose device such as a computer or special purpose device such as a client, a server, etc., and this general or special purpose device can be implemented as a hardware processor (which can be a microprocessor, digital signal processor, a microcontroller, etc.); a driver/actuator 1010 (e.g., a motor, a linear actuator, a microelectromechanical (MEMS) device, etc.) for controlling a position 1012 of lens 1002 and/or a position 1014 of image sensor 1004 along a direction parallel to an optical axis 1020 of camera 1000; an input device 1016 (such as a shutter button, a menu button, a microphone, a touchscreen, a motion sensor, a etc., or any suitable combination thereof) for accepting input from a user and/or from the environment; a display 1018; and an I/O port 1022 for allowing communication between controller 1008 and other devices, such as a smartphone, a tablet computer, a laptop computer, a personal computer, a server, etc, via a communication link. Camera 1000 can further include memory 1020 for storing images, duration focal volumes, space-time in-focus images, space-time index maps, etc. In some embodiments, memory 1020 can include a storage device (e.g., a hard disk, a Blu-ray disc, a Digital Video Disk, RAM, ROM, EEPROM, etc.) for storing a computer program for controlling controller 1008.

In some embodiments, camera 1000 can communicate with a remote device over a network using I/O port 1022 and a communication link Additionally or alternatively, camera 1000 can be included as part of another device, such as a smartphone, a tablet computer, a laptop computer, etc. Parts of camera 1000 can be shared with a device with which camera 1000 is integrated. For example, if camera 1000 is integrated with a smartphone, controller 1008 can be a processor of the smartphone and can be used to control operation of camera 1000.

Camera 1000 can be integrated with and/or communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, a smartphone, a tablet computer, a personal data assistant (PDA), a personal computer, a laptop computer, a multimedia terminal, a special purpose device, a game console, etc.

Communications over I/O port 1022 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between camera 1000 and another device, such as a network link, a dial-up link, a wireless link, a hard-wired link, any other suitable communication link, or any suitable combination of such links. Camera 1000 and/or another device (e.g., a server, a personal computer, a smartphone, etc.) can enable a user to execute a computer program that allows the features of the mechanisms described herein to be used.

It should also be noted that data received through the communication link or any other communication link(s) can be received from any suitable source. In some embodiments, controller 1008 can send and receive data through the communication link or any other communication link(s) using, for example, a transmitter, receiver, transmitter/receiver, transceiver, or any other suitable communication device.

Figure 11:
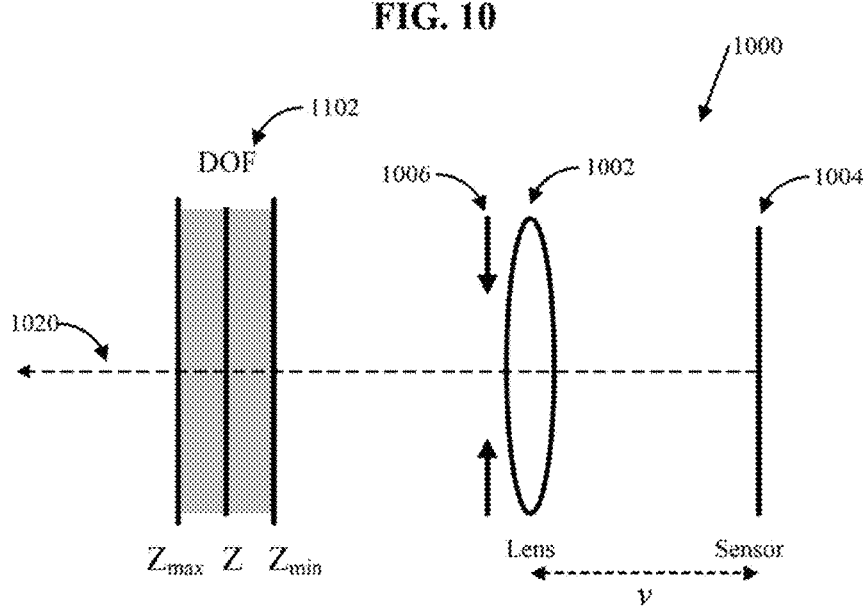
FIG. 11 shows an example of a depth of field of a camera in accordance with some embodiments of the disclosed subject matter.

FIG. 11 is an illustrative diagram showing a depth of field (DOF) 1102 in accordance with some embodiments. DOF 1102 can be calculated from properties of camera 1000 using the following equation:

$$DOF = \frac{2*c*v*f*N}{(v-f)^2 - c^2*N^2}, \quad (1)$$

where c is the circle of confusion of the imaging device, which, for example, can be the pixel size of pixels in an image sensor (e.g., an effective light receiving area of the pixel), v is the distance between lens 1002 and sensor 1004, f is the focal length of lens 1002, and N is the f-number of the combination of the lens and an aperture, A, set by aperture stop 1006. As shown in FIG. 11, a DOF 1102 is equal to a range $Z_{min}$ to $Z_{max}$ around a distance Z from lens 1002 where the blur of light from objects is less than the circle of confusion. Objects within DOF 1102 (e.g., objects that have a distance from camera 1000 between $Z_{max}$ and $Z_{min}$) appear focused despite not being located precisely at the focal plane of camera 1000.

In some embodiments, various depths of field $DOF_1$ to $DOF_n$ captured with different focal settings (e.g., by moving an image sensor) can be required to meet the following two criteria:

A) Completeness: When all objects in the scene are covered by at least one DOF. For example, the union of DOFs can cover the whole interested depth range as shown in the following equation:

$$DOF_1 \cup DOF_2 \cup DOF_3 \cup \ldots \cup DOF_n = DOF \quad (2)$$

B) Efficiency: When each object is covered by only one DOF (e.g., is in focus in only one captured image), such that there is no overlap between two DOFs. Avoiding overlap can allow a large DOF to be captured using a limited number of frames. For example, the intersection of the DOFs can be an empty set as shown in the following equation:

$$DOF_1 \cap DOF_2 \cap DOF_3 \cap \ldots \cap DOF_n = \emptyset \quad (3)$$

Meeting the criterion for completeness and efficiency can allow for all objects of interest in a scene to be captured using multiple images over multiple DOFs.

Determining sensor positions at which to capture images to satisfy the completeness and efficiency criteria can be derived starting with the thin lens formula:

$$\frac{1}{f} = \frac{1}{v} + \frac{1}{z}, \quad (4)$$

where z is the distance to an object in the scene and, as described above, f is the focal length and v is the distance from the lens to the image sensor. Equation (4) can be represented in the reciprocal domain as:

$$\hat{f} = \hat{v} + \hat{z} \quad (5)$$

Using equation (5), the depth of field from equation (1) can be derived in the reciprocal domain using the following pair of equations:

$$\begin{cases} \hat{z}_{max} = \hat{z} + \hat{v}*c/A \\ \hat{z}_{min} = \hat{z} - \hat{v}*c/A \end{cases}, \quad (6)$$

where, as described above, c is the circle of confusion and A is the aperture of the camera.

For sampling that satisfies both the completeness and efficiency criteria as described above, the various DOFs captured can be continuous and have no overlap. Therefore, changes in v from one sampling to another can satisfy the following equation:

$$|\hat{v}_1 - \hat{v}_2| = (\hat{v}_1 + \hat{v}_2)*c/A \quad (7)$$

Equation (7) can be rewritten from the reciprocal domain as follows:

$$|v_2 - v_1| = |v_2 + v_1|*k, \quad (8)$$

where k=c/A. When distances $v_1$ and $v_2$ are close to the focal length f, equation (8) can be rewritten as:

$$|v_2 - v_1| = 2*f*k, \quad (9)$$

which, in turn, can be rewritten as:

$$|v_2 - v_1| = 2*c*N. \quad (10)$$

As can be seen in equation 10, when the distances $v_1$ and $v_2$ are close to f, the displacement of the sensor from $v_1$ to $v_2$ to change the depth of field from $DOF_1$ to $DOF_2$ is related to pixel size c and lens f-number N. In some embodiments, in which frames are captured at fixed intervals $\Delta t$ (e.g., at a constant frame rate), a sweep of the image sensor can be carried out at a constant speed $\Delta v$, as follows:

$$\frac{\Delta v}{\Delta t} = 2*c*N*P, \quad (11)$$

where P is the frame rate (e.g., a number of frames per unit time). It should be noted that equation (11) shows that, given a constant frame rate P, a total depth of field can be captured to meet the completeness and efficiency criteria by moving the image sensor at a constant speed, $\Delta v/\Delta t$ that is dependent on circle of confusion c (or pixel size c), camera f-number N, and frame rate P. Therefore, the sensor can be moved at a constant speed while capturing frames at a constant frame rate P for a complete and efficient depth of field sampling, given a set of imaging device parameters (e.g., lens f-number, aperture, pixel size, etc.).

Figure 12:
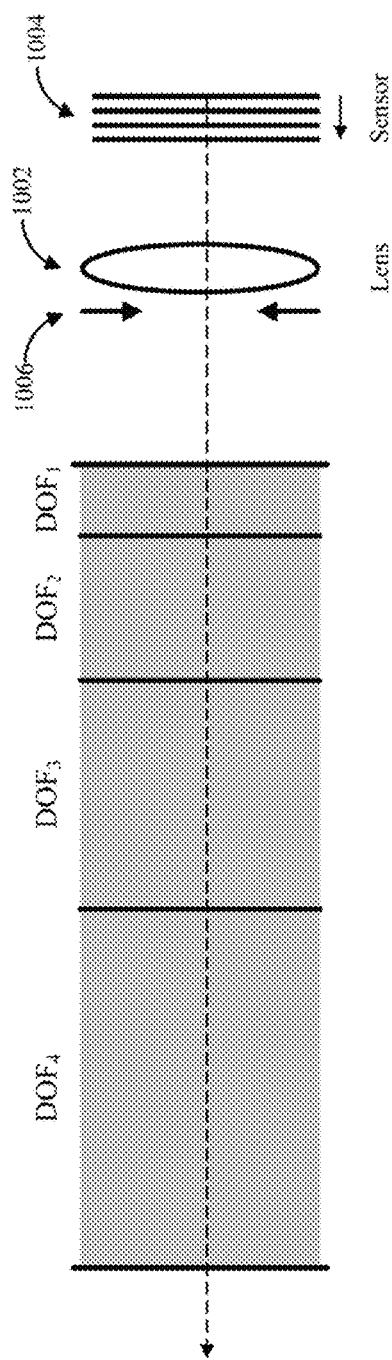
FIG. 12 shows an example illustrating various depths of field of a camera in accordance with some embodiments of the disclosed subject matter.

FIG. 12 shows an example of various depths of field $DOF_1$ to $DOF_4$ sampled completely and efficiently (as defined above) while moving image sensor 1004 at a constant speed, in accordance with some embodiments. As shown in FIG. 12, each DOF is continuous with the adjacent DOF without overlapping the adjacent DOF.

In some embodiments, due to the limitations of hardware being used to capture images, it may not be possible to sample the various depths of field completely and efficiently. In such cases, there may be overlapping DOFs such that the various DOFs captured are sampled completely and substantially efficiently (e.g., there is overlap, but the overlap may be small compared to the size of each DOF). Conversely, there may be gaps between adjacent DOFs such that the various DOFs captured are sampled efficiently and substantially completely (e.g., there is no overlap and the gaps between the DOFs may be small compared to the size of each DOF).

In some embodiments in which images are not captured at a constant frame rate, positions at which to capture images to capture desired depths of field can be calculated rather than calculating a speed at which to move an image sensor. As an example, if an image sensor can be moved at a given linear speed (e.g., an average speed), equation (11) can be solved for a frame rate at which to capture images given that linear speed. As another example, an image sensor can be driven to particular positions and stopped while an image is captured, and then moved to a next position, to capture a next image, until images are captured for each desired depth of field.

Various techniques (other than moving the image sensor) can be used to alter the depth of field at which a frame is captured. For example, in some embodiments, a lens of a camera can be moved relative to an image sensor of the camera along an optical axis of the image sensor and the lens, and images can be captured at various positions of the lens, thereby changing the depth of field among the various images.

Additionally or alternatively, a position of an additional optical element can be changed relative to an image sensor and/or a lens of the camera and images can be captured at various positions of the additional optical element. In one example, the additional optical element can one or more additional lenses in addition to a main image capturing lens (or lens group), and images can be captured at various positions of the additional lens(es).

In another example, the additional optical element can be an optical element that can change the length of a path that light travels from a scene to the image sensor. More particularly, the additional optical element can include one or more prisms (and/or mirrors) placed in the path of light traveling between the lens and the image sensor in which one or more of the prisms (and/or mirrors) can be moved to increase the path length that light travels from the lens to the image sensor, thereby effectively changing the distance between the lens and the image sensor (e.g., v as used in equation (4) above).

In yet another example, the additional optical element can include one or more optical elements with one or more refractive indices that can be placed in the path of light travelling between the lens and the image sensor, and that can change the optical path length of the light when travelling from the scene to the image sensor, thereby effectively changing the distance between the lens and the image sensor (e.g., v as used in equation (4) above). It should be noted that in the previous two examples, if the additional optical element is placed in the path of light travelling between a scene and the lens, this can effectively change the distance between the scene and the image sensor (e.g., z as used in equation (4) above).

Additionally or alternatively, a focal length of a lens of a camera can be changed in order to change the depth of field, and images can be captured at various focal lengths of the lens. For example, in some embodiments, a focal length of a camera can be changed using a liquid lens that has a focal length that can be varied by applying different amounts of voltage to the lens. In another example, in some embodiments, a focal length of a camera can be changed using a compound lens in which the distance between various lens components can be adjusted to change the focal length, f, of the compound lens.

Additionally or alternatively, an aperture of the camera can be changed in order to change the depth of field and images can be captured at various apertures, thereby changing the depth of field among the various images. For example, an aperture stop (e.g., a diaphragm) of a camera can be used to change an effective diameter of the camera lens. As described herein, changes in the diameter of the aperture can cause a change in the depth of field of a camera.

Additionally or alternatively, a distance between a camera and a scene can be changed in order to change the depth of field and images can be captured at various distances from the scene, thereby changing the depth of field among the various images. For example, a camera can be moved toward or away from a scene in order to change which objects in the scene are within the depth of field of the camera. In such an example, the camera (e.g., the image sensor and lens) can be mounted on a stage that can be moved in relation to a scene (e.g., by using an actuator, gears, a screw, etc.). In another example, the scene can be mounted on stage that can be moved in relation to the camera. In one particular example, the mechanisms described herein can be used with a microscope in order to capture various depths of field for a microscopic scene.

In some embodiments, a single technique for changing the depth of field can be used while holding some other properties of the camera unchanged. For example, a distance between the image sensor and the lens of a camera can be changed (e.g., by moving the image sensor, the lens, or both) when capturing consecutive images, thereby changing a depth of field. In such an example, the focal length of the lens, the distance between the camera and the scene, and the aperture can be maintained at substantially the same values to inhibit undesired changes to the depth of field.

Alternatively, multiple techniques for changing the depth of field as described above can be combined in order to change the depth of field. For example, a distance between an image sensor and a lens can be changed while at the same time changing the aperture and/or focal length of the lens. This can allow for changes to the depth of field using smaller changes in the distance between the lens and the image sensor than would be required for the same change in depth of field if only moving the lens and/or the image sensor.

Figure 13:
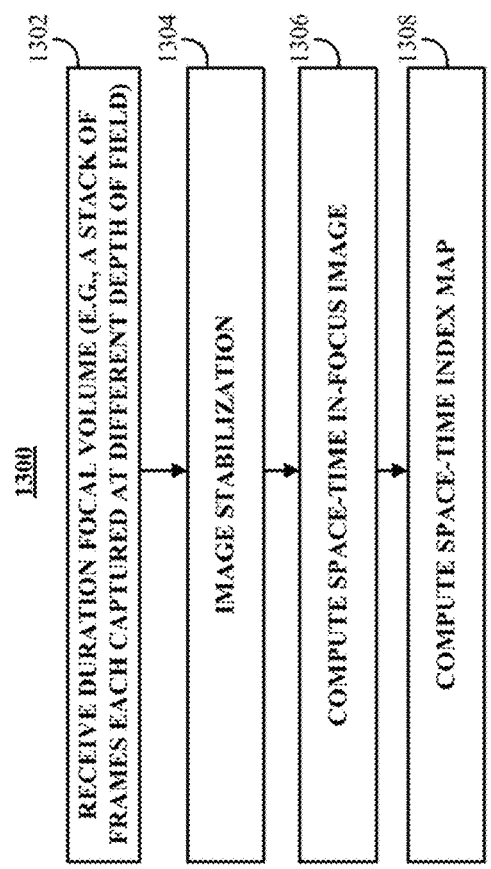
FIG. 13 shows an example of a process for computing a space-time index map in accordance with some embodiments of the disclosed subject matter.

Turning to FIG. 13, an example 1300 of a process for computing a space-time index map from a duration focal volume is illustrated in accordance with some embodiments. Process 1300 can begin at 1302 by receiving a duration focal volume that includes a stack of frames where each frame was captured with a different depth of field. In some embodiments, the depths of field at which the frames of the duration focal volume were captured can meet the criteria for efficiency and completeness described above.

At 1304, image stabilization can be performed on the duration focal volume prior to computing a space-time in-focus image and space-time index map at 1306 and 1308 respectively. In some embodiments, any suitable technique for image stabilization can be used.

Figure 14:
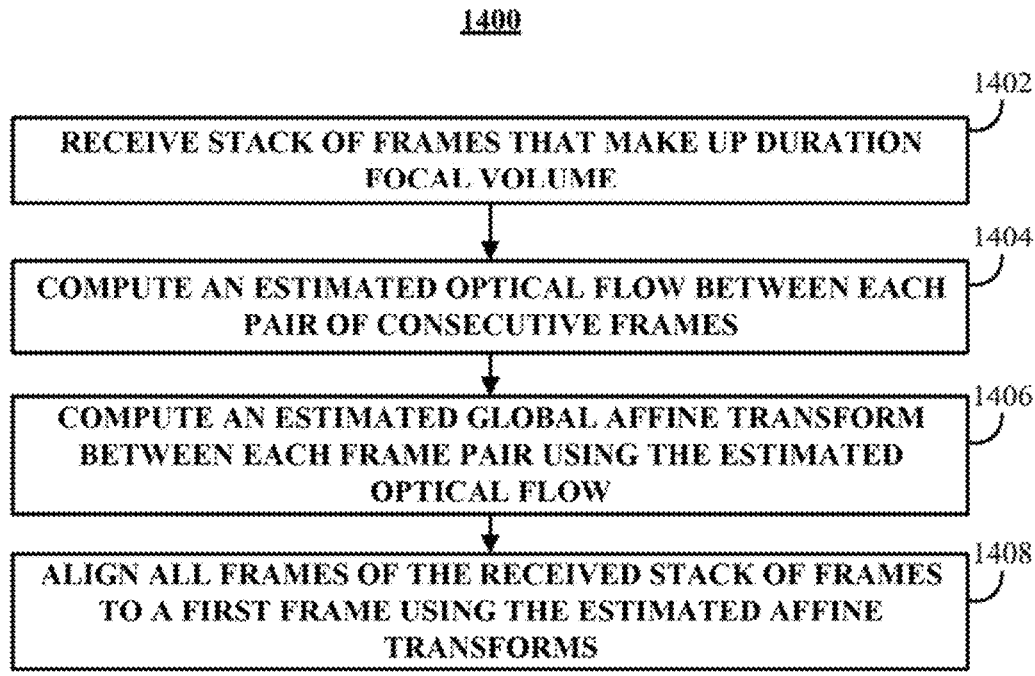
FIG. 14 shows an example of a process for image stabilization of a duration focal volume in accordance with some embodiments of the disclosed subject matter.

FIG. 14 shows an example 1400 of a process for performing image stabilization in accordance with some embodiments. At 1402, a stack of frames that make up the duration focal volume can be received and an estimated optical flow between each pair of consecutive frames can be computed at 1404. At 1406, a global affine transform between each frame pair can be calculated based on the estimated optical flow between each pair of consecutive frames. At 1408, all frames of the received stack of frames can be aligned to a frame in the stack of frames (e.g., first frame, a median frame, a last frame, or any other suitable frame) using the global estimated affine transform. In some embodiments, this can be used to stabilize images captured over a period of time when there is global camera motion (e.g., hand shake, etc.).

Referring back to FIG. 13, at 1306, a space-time in-focus image can be computed. As described above, the space-time in-focus image can be an extended depth of field (EDOF) image calculated from the duration focal volume. In some embodiments, any suitable technique can be used for computing a space-time in-focus image from the duration focal volume.

Figure 15:
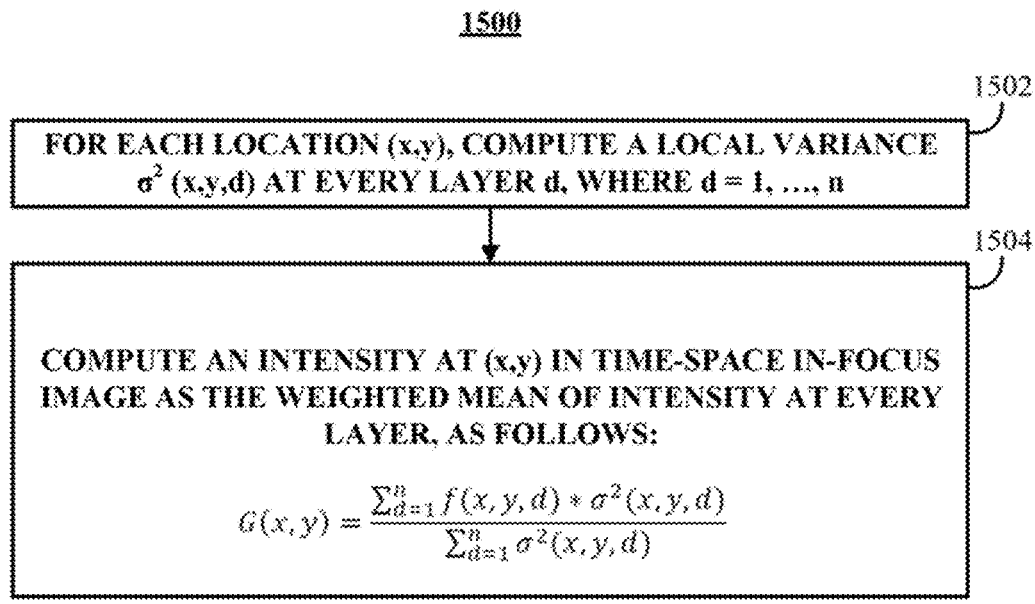
FIG. 15 shows an example of a process for computing a space-time in-focus image of a duration focal volume in accordance with some embodiments of the disclosed subject matter.

FIG. 15 shows an example 1500 of a process for computing a space-time in-focus image from the duration focal volume received at 1302. In some embodiments, the space-time in-focus image can be computed from the stack of frames that make up the duration focal volume that have undergone an image stabilization process at 1304. At 1502, at each location (x,y) in the scene, a local variance $\sigma^2(x,y,d)$ can be computed at point (x,y) in each layer d (i.e., for d=1 to d=n). This local variance $\sigma^2(x,y,d)$ can then be used to weight the value at (x,y) when computing the space-time in-focus image. In some embodiments, the local variance can be based on neighboring pixels, with pixels that are closer to point (x,y) having a greater weight. For example, the local variance can be computed using a Gaussian kernel of radius seven, and a total of approximately twenty one neighboring pixels. It should be noted that any suitable technique(s) can be used to calculate the local variance and a particular technique to be used can be based on parameters of the camera (e.g., pixel size, aperture, etc.).

At 1504, an intensity G at each point (x,y) in a space-time in-focus image can be calculated according to the following:

$$G(x, y) = \frac{\sum_{d=1}^{n} f(x, y, d) * \sigma^2(x, y, d)}{\sum_{d=1}^{n} \sigma^2(x, y, d)}, \quad (11)$$

where f(x,y,d) is the intensity value at point (x,y) in frame d, and $\sigma^2(x,y,d)$ is the local variance at point (x,y,d) in the duration focal volume. The values computed for the space-time in-focus image at each point (x,y) can be used to create the space-time in-focus image G.

Returning to FIG. 13, a space-time index map can be calculated at 1308 based in part on the space-time in-focus image computed at 1306. Any suitable technique can be used to compute a space-time index map (or a three-dimensional space-time index map). For example, a reliable but sparse depth map can be calculated based on duration focal volume V and space-time in-focus index map G. The reliable but sparse depth map can then be smoothed and filled and a final depth map can be outputted as the space-time index map. A more detailed example of building a depth map from a reliable but sparse depth map is described below in connection with FIGS. 16-19.

As another example, a greedy search can be performed to determine an in-focus point and depth for each point in each layer of duration focal volume V. A more detailed example of building a depth map from a reliable but sparse depth map is described below in connection with FIG. 20.

As yet another example, as described above, a machine learning process can be used to identify an in-focus depth for each point in duration focal volume V. More particularly, for example, known depth maps can be used to train a classification model for identifying a neighboring pixel that is an in-focus pixel corresponding to each pixel in duration focal volume V. A more detailed example of training and using a classification model for calculating a space-time map index is described below in connection with FIG. 21.

As still another example, an optical flow estimation process can be used to identify an in-focus depth for each point in the duration focal volume V. More particularly, for example, an optical flow between frames can be calculated, and a trajectory can be calculated for each point in duration focal volume V. A sharpest point along the trajectory can be calculated and used in a space-time index map. A more detailed example of using an optical flow estimation process for computing a space-time index map is described below in connection with FIG. 22.

Figure 16:
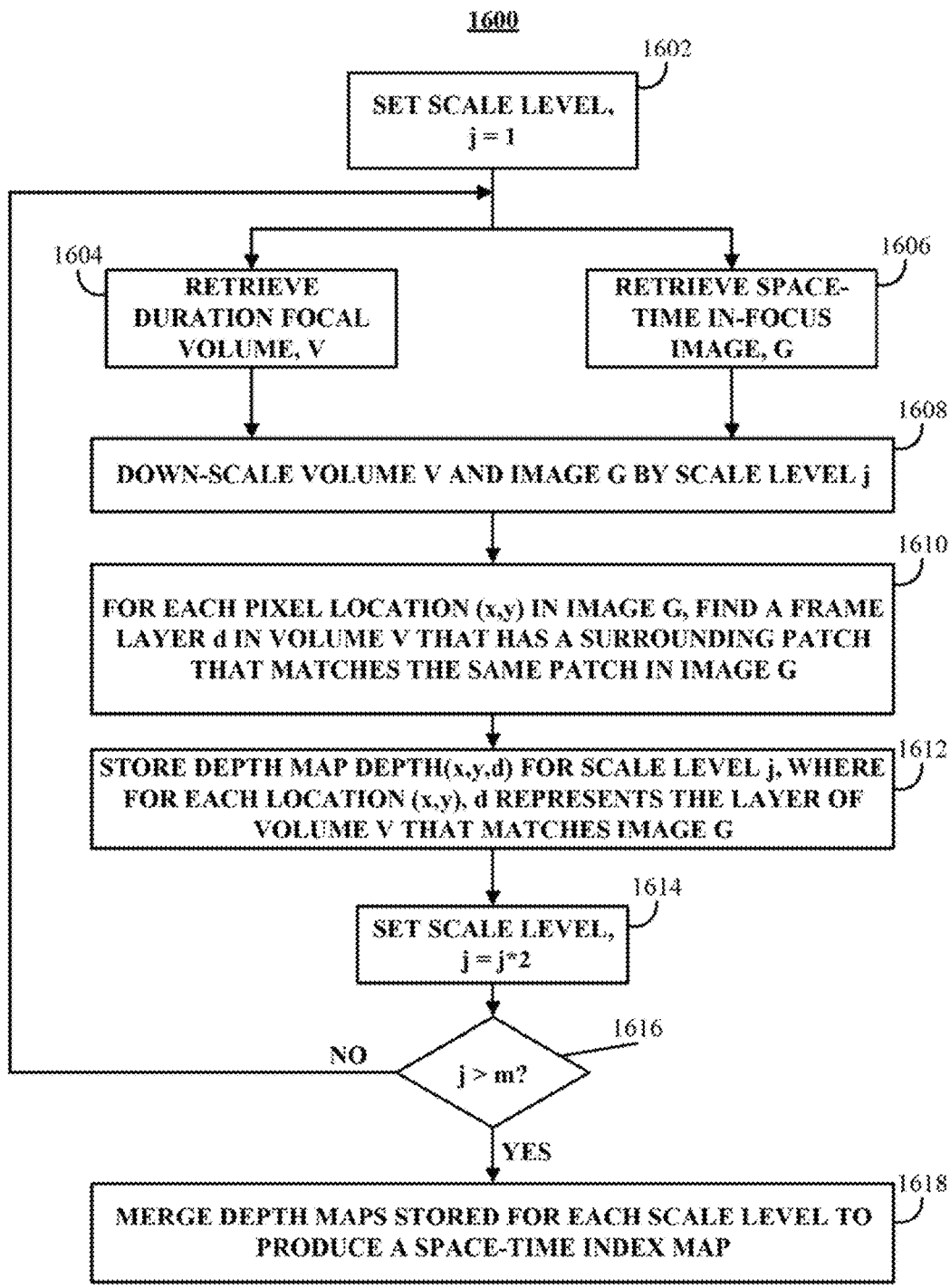
FIG. 16 shows an example of a process for computing a space-time index map for a duration focal volume in accordance with some embodiments of the disclosed subject matter.
Figure 19:
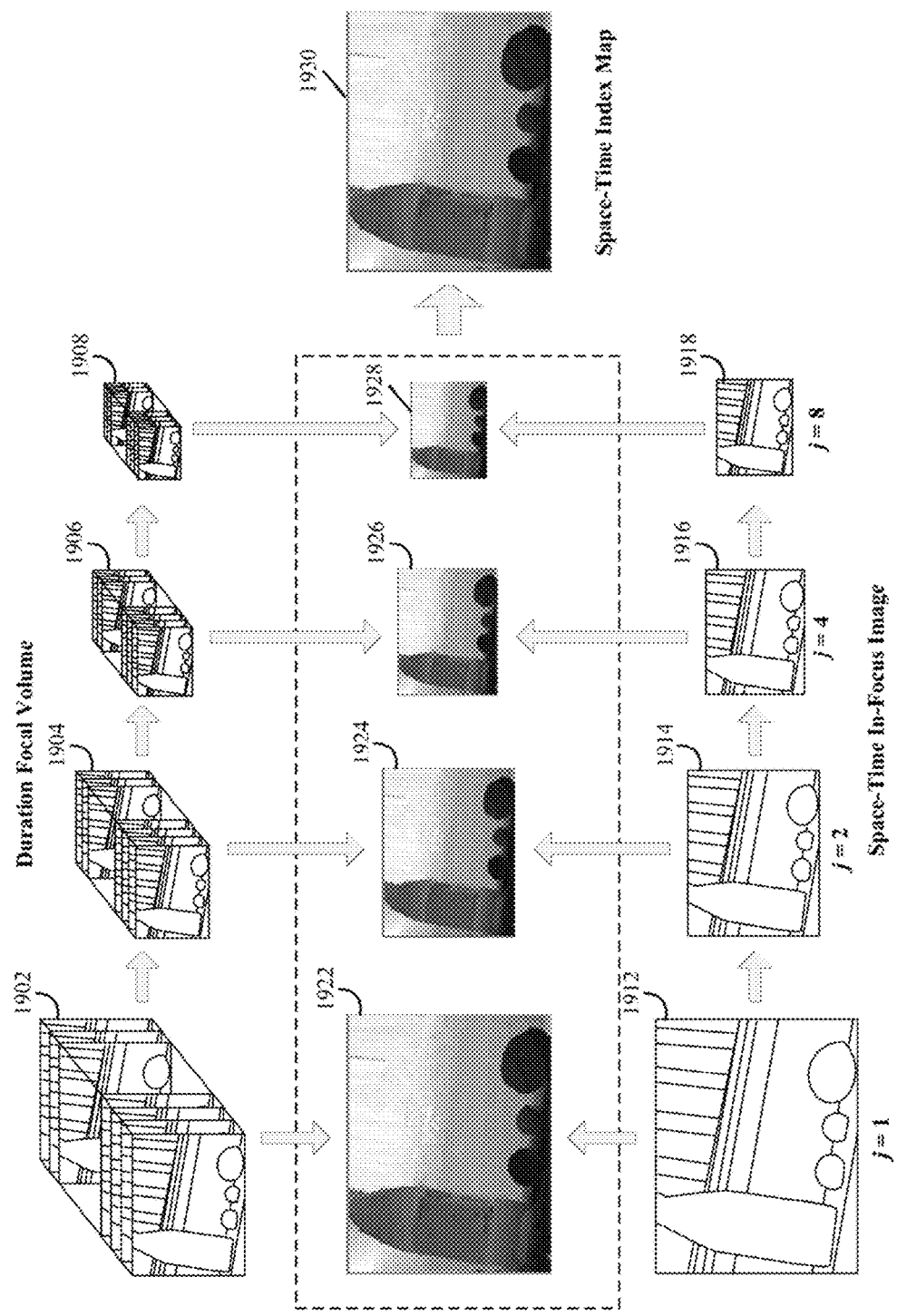
FIG. 19 shows an example of scaled space-time in-focus images, scaled duration focal volumes, and scaled depth maps used in processes for computing a space-time index map in accordance with some embodiments of the disclosed subject matter.

Turning to FIG. 16, an example 1600 of a process for computing a space-time index map is illustrated in accordance with some embodiments. At 1602, a scale level j that can be used to down-scale the areas of the space-time in-focus image and duration focal volume V can be set to one. In some embodiments, a predetermined number of scaled versions of duration focal volume V and the space-time in-focus image can be generated. Versions of the same scale j can be compared to create a depth map of scale j. For example, four versions of duration focal volume V and four versions of the space-time in-focus image can be generated and used to create four scaled depth maps. FIG. 19 shows examples of four versions 1902-1908 of duration focal volumes and space-time in-focus images 1912-1918 at four different scales. In the example of FIG. 19, the scaled duration focal volume and the space-time in-focus image of the same scale are used to create a depth map 1922-1928 at each scale. In such an example, depth maps 1922-1928 can be used to create a space-time index map 1930 using any suitable techniques, such as, the techniques described herein.

Returning to FIG. 16, at 1604, duration focal volume V can be retrieved and/or, at 1606, the space-time in-focus image G can be retrieved. In some embodiments, duration focal volume V (also referred to herein as volume V) and space-time in-focus image G (also referred to herein as image G) can be stored in memory of a camera, memory of a computer, and/or memory of a server. At 1608, one or both of the volume V and image G can be down-scaled by scale level j to provide down-scaled images. Down-scaling can be performed using any suitable technique. As one example, the frames (or images) that make up volume V and image G can be down-scaled using binning techniques such that the area of each scaled image is reduced by scale level j. As another example, the frames that make up volume V and image G can be down-scaled using bicubic interpolation such that the area of each scaled image is reduced by scale level j.

At 1610, locations in the image G scaled at scale level j can be compared to locations in each frame of the volume V scaled at scale level j, and a frame with a matching area at the same location can be found. This comparison can be performed in any suitable manner, for example, in some embodiments, for each pixel location (x,y) in image G, a frame at layer d can be found in volume V that has a surrounding patch that matches the same patch in image G. In such embodiments, the patch size can be fixed at a specific size for the images at each of the different scales. For example, the patch can include a group of five by five pixels including the pixel at location (x,y). As another example, the patch can include the pixel at location (x,y) and eight pixels neighboring the pixel at pixel location (x,y). In some embodiments, a similarity score can be calculated between the image data of the patch from layer d of volume V and the image data of the patch from image G. If the similarity score is higher than a threshold, the patches can be considered to be a match. Any suitable similarity score (e.g., such as a cross-correlation value between patches, a normalized cross-correlation value between patches, a number of differences between the patches, a distance metric (such as a Mahalanobis distance) between the patches, etc.) can be used in some embodiments.

At 1612, a depth map can be stored for scale level j based on the results of the comparing at 1610. In some embodiments, the depth map can include a depth index value, d, at each location (x,y) where a match was found between image G and volume V at scale j. When the depth map is completed for scale j, process 1600 can proceed to 1614.

At 1614, scale level j can be doubled such that j equals 2*j. At 1616, it can be determined whether j is greater than m, where m is the maximum scaling factor to be calculated. If j is greater than m ("YES" at 1616), process 1600 can proceed to 1618. Otherwise, if j is less than or equal to m ("NO" at 1616), process 1600 can return to 1604 and/or 1606. Alternatively, any other suitable technique can be used to determine when a satisfactory number of scaled images have been created.

At 1618, when a predetermined number of depth maps for a predetermined number of scales have been calculated, the depth maps for each scale can be merged to produce a space-time index map for the duration focal volume V. This merging can be performed in any suitable manner.

Figure 17:
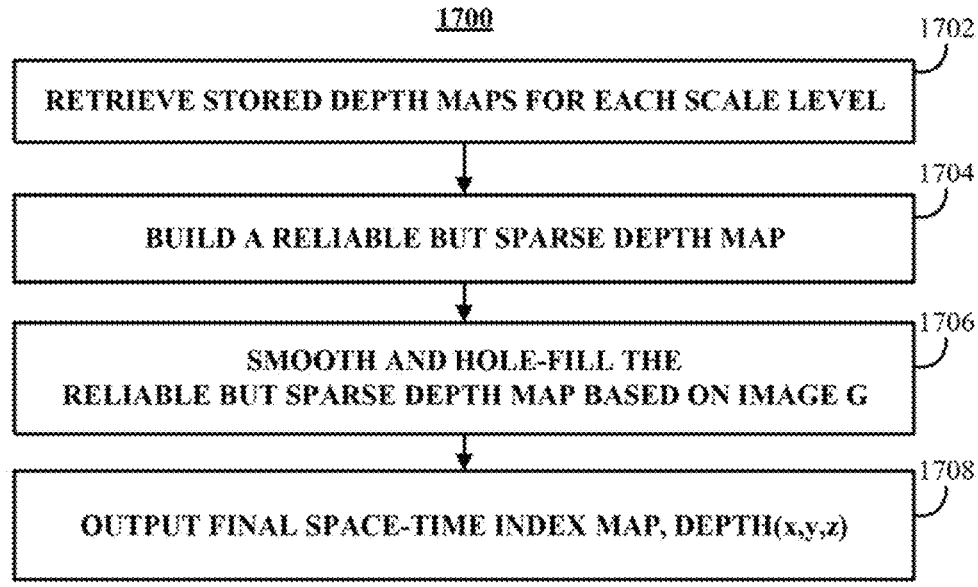
FIG. 17 shows an example of a process for merging depth maps that correspond to a duration focal volume at different scales in accordance with some embodiments of the disclosed subject matter.

For example, FIG. 17 shows an example 1700 of a process for merging the depth maps created using process 1600 in accordance with some embodiments. Process 1700 can begin at 1702 by retrieving the depth maps for each scale created by process 1600. At 1704, a sparse depth map can be built from the depth maps retrieved at 1702. Such a sparse depth map can be created using any suitable techniques. For example, in some embodiments, for each location within the scene, the index value, d, can be compared among the various scales and the depth for that location can be set based on the comparison. More particularly, for example, for a particular location in a scene, index d from each depth map can be compared to index d at that location for each of the other depth maps. A difference in the index between the depth maps can be computed and can be compared to a predetermined maximum difference. The maximum difference can be any suitable value and can depend on the number of frames in the duration focal volume. For example, the maximum difference can be two frames. In such an example, if the maximum difference of the estimated depth at a location in the scene is greater than two frames apart, the depth at that location can be considered unreliable. On the other hand, if the maximum difference between the estimated depth at a location in the scene is equal to or less than two frames apart, the depth at that location can be considered reliable.

At locations where the depth is considered reliable, a final depth for the location can be determined by averaging the estimated depths at that location from the depth maps for each scale level. In some embodiments, the averaged index can be rounded to the depth of the nearest frame. For example, where the average results in a depth that is between frames, the depth at the location can be rounded to the nearest frame. These index values can be used to create the sparse depth map. In some embodiments, at locations where the difference between indexes using the various depth maps is greater than the maximum difference, depth information in the sparse depth map can be left unassigned.

At 1706, the sparse depth map built at 1704 can be smoothed and unreliable portions (e.g., portions where the difference was greater than the maximum difference) can be filled based on space-time in-focus image G. This smoothing and filling can be performed in any suitable manner.

Figure 18:
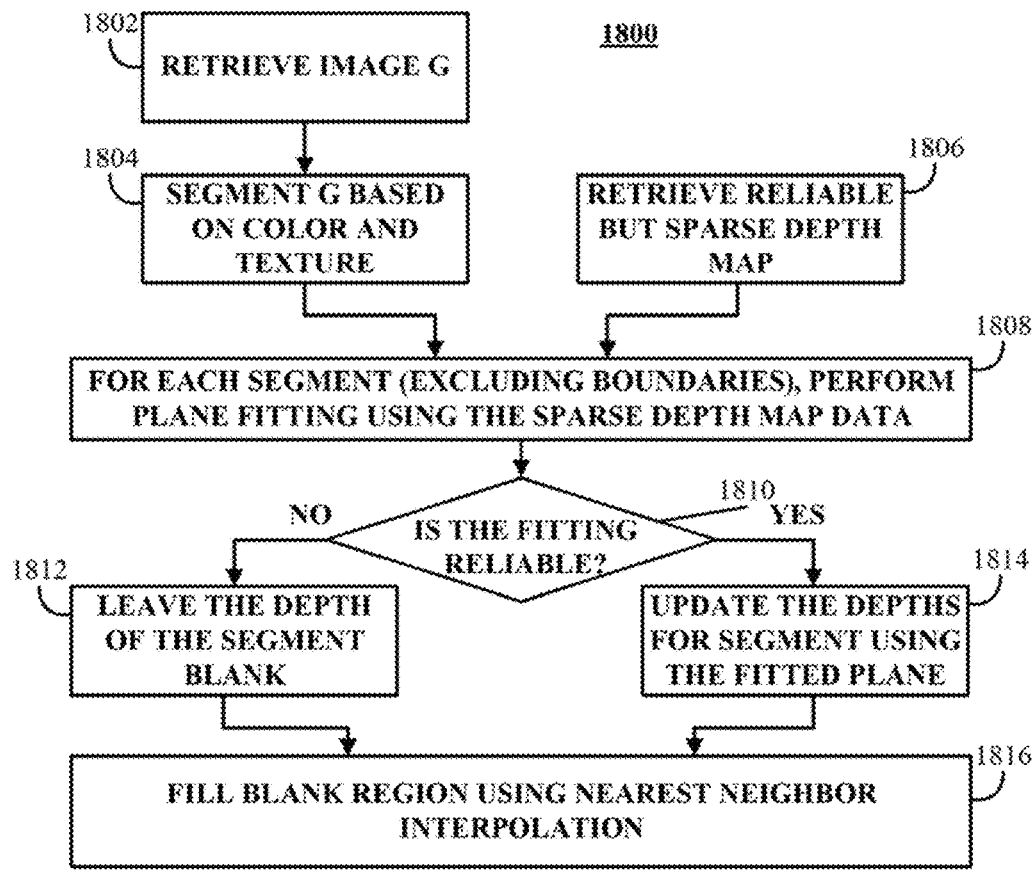
FIG. 18 shows an example of a process for smoothing a depth map corresponding to a duration focal volume in accordance with some embodiments of the disclosed subject matter.

For example, FIG. 18 shows an example 1800 of a process for smoothing and hole filling the sparse depth map in accordance with some embodiments. At 1802, space-time in-focus image G can be retrieved and image G can be segmented based on color and texture at 1804. Any suitable technique can be used to segment image G. For example, a Graph-Cut algorithm can be used to segment space-time in-focus image G based on color and texture into segments that are likely to correspond to the same object. More particularly, for example, the segments can be found based on the color and texture of the objects in space-time in-focus image G. At 1806, the sparse depth map built at 1704 can be retrieved to be used in performing smoothing and hole-filling.

At 1808, at each segment identified at 1804, a plane can be fit to the segment based on the sparse depth map and space-time in-focus image G. This plane fitting can be performed in any suitable manner. For example, in some embodiments, each segment can include reliable pixels (e.g., pixels assigned a particular depth) and unreliable pixels (e.g., pixels that have not been assigned a particular depth). A plane can be fit using any reliable pixels within the segment. In such an embodiment, boundary pixels (e.g., pixels at the edge of a segment) can be excluded when performing a plane fitting.

At 1810, it can be determined if the plane fit to the reliable pixels is a close fit. Any suitable technique can be used to determine whether the plane is a close fit. For example, in some embodiments, an error between the plane calculated for a segment at 1808 and each of the reliable depths in that segment can be determined. If any of the errors is over a threshold, the entire segment can be classified as unreliable. For example, if the difference between the depth determined from the plane and the depth of a reliable pixel is greater than two, the entire segment can be classified as unreliable. As another example, if the number of reliable pixels in a particular segment is below a threshold (e.g., five pixels) the entire segment can be classified as unreliable. If it is determined that the fitting of the plane is unreliable ("NO" at 1810), process 1800 can proceed to 1812 at which the unreliable portions of the segment can be left blank. Otherwise, if it is determined that the fitting of the plane is reliable ("NO" at 1810), process 1800 can proceed to 1814.

At 1814, the depths of the segment at locations that were previously determined to be unreliable can be filled based on the plane that was calculated at 1808. This filling can be performed in any suitable manner. For example, in some embodiments, pixels that were previously considered reliable can be reassigned values at 1814 based on the plane that was calculated at 1808 in order to make the depth values for each segment more uniform.

At 1816, any remaining blank regions (e.g., unreliable pixels in unreliable segments and segment boundaries) can be filled based on interpolating from the depth values of neighboring reliable pixels and/or filled pixels determined at 1814. For example, depth values for unreliable pixels having the greatest number of neighbors with depth values can be interpolated first. In such an example, holes can be filled by interpolating values from the edges of the hole toward the center, using the nearest neighbors that have a reliable or interpolated depth value. In another example, holes can be filled by interpolating from a nearest neighbor in each direction having a reliable depth value.

Returning to FIG. 17, at 1708, a space-time index map can be outputted based on the depth map created by smoothing and hole-filling performed at 1706.

In some embodiments, rather than scaling the volume and image and comparing the scaled versions using a constant patch size, a similar process can be used except the volume and image can be kept a constant size and can be compared using different patch sizes. In some embodiments, a combination of scaling and the use of different patch sizes can be utilized to create a space-time index map.

Figure 20:
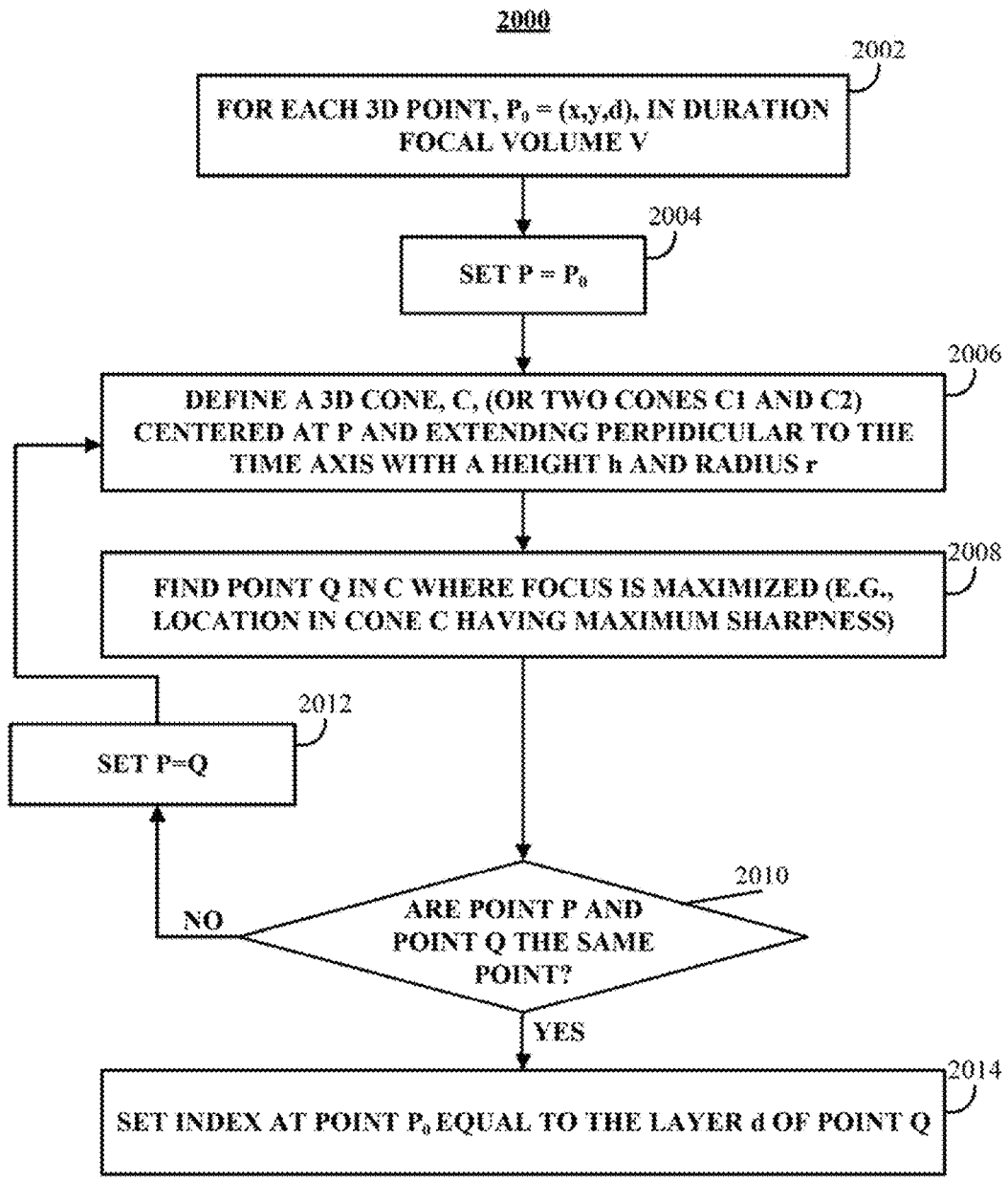
FIG. 20 shows an example of a process for computing a space-time index map for a duration focal volume using a greedy search in accordance with some embodiments of the disclosed subject matter.

Turning to FIG. 20, an example 2000 of a process for determining an in-focus point in the duration focal volume that corresponds to a specified point in the duration focal volume is illustrated in accordance with some embodiments. At 2002, a point $P_0$ can be selected, where $P_0$ has coordinates (x,y,d) in the duration focal volume V. More particularly, for example, point $P_0$ can be described by a pixel location (x,y) and a frame location d that corresponds to the depth of field at which point $P_0$ was captured.

At 2004, a point P can be set to $P_0$, and a three-dimensional cone, C, can be defined at 2006 within duration focal volume V with a height h and a radius r extending from (and including) point P in the time direction. Such a three dimensional cone can be defined so that it is perpendicular to the time axis of the duration focal volume. In some embodiments, two cones, C1 and C2, can be defined, where C1 and C2 are similar to cone C, except one of the two cones extends in the opposite direction from P. In some embodiments, cone C (or cones C1 and C2) can extend from point P to the first (or last) frame in the duration focal volume.

At 2008, a point Q can be found within cone C (or cones C1 and C2) where sharpness is maximized. At 2010, it can be determined whether point P and point Q are the same point in duration focal volume V. For example, it can be determined if point P and point Q have the same coordinates (x,y,d) in duration focal volume V. If point P is not equal to point Q ("NO" at 2010), process 2000 can proceed to 2012 where point P can be set equal to point Q and process 2000 can return to 2006 and draw a new cone C centered on newly set point P. Otherwise, if point P is equal to point Q ("YES" at 2010), process 2000 can proceed to 2014.

At 2014, an index for point $P_0$ can be set to the depth where point Q was located when it was determined that point P was equal to point Q.

Process 2000 can be repeated for each point within duration focal volume V and the results can be used to construct a three-dimensional space-time index map.

It should be noted that the term "cone" used herein can refer to a shape that approximates a cone but includes discrete steps between sections (e.g., an approximation of a cone).

Figure 21:
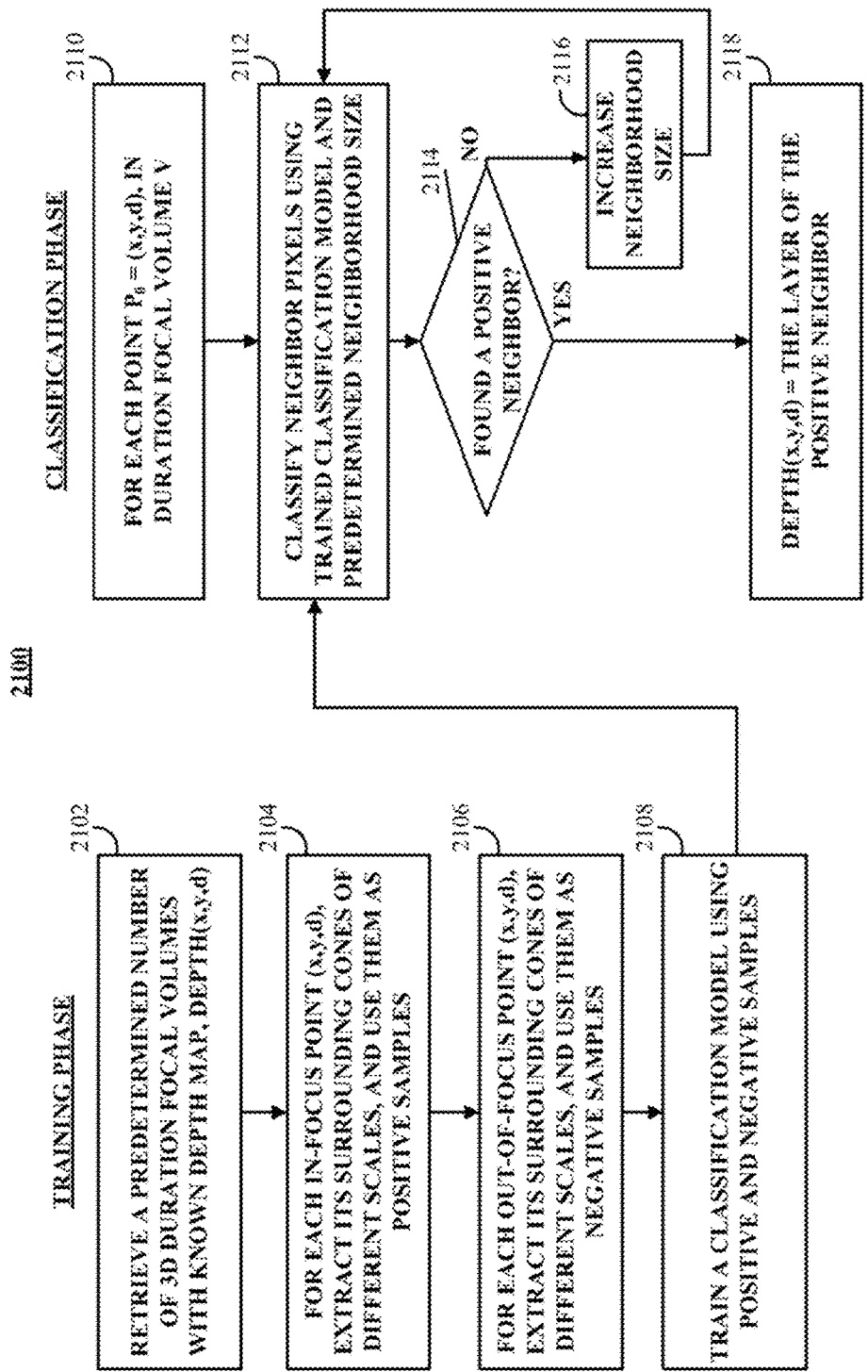
FIG. 21 shows an example of a process for computing a space-time index map for a duration focal volume using machine learning in accordance with some embodiments of the disclosed subject matter.

FIG. 21 shows an example 2100 of a process for using machine learning techniques to classify points in duration focal volume as in-focus points or out-of-focus points in accordance with some embodiments. Process 2100 can begin by training a classification model at 2102-2108, and then can use the trained classification model to find one or more in-focus points in a duration focal volume at 2110-2118.

At 2102, a predetermined number of three-dimensional duration focal volumes can be retrieved where the location of objects within the focal volume (e.g., (x,y) location at each depth) and an in-focus layer for each object are known. In some embodiments, the duration focal volumes retrieved can be synthesized duration focal volumes. Alternatively, object locations and in-focus depths for a duration focal volume retrieved can be known based on any suitable technique, such as techniques described herein, and/or can be identified by a user.

At 2104, cones can be extracted around each in-focus point within the duration focal volume at different scales (e.g., the duration focal volume can be scaled in a similar fashion as described above in connection with FIG. 16). An apex for the cones of a particular in-focus point in the scene can be at the in-focus point of an object in the scene, and the cones can extend through the layers of the duration focal volume toward points where the object is less in focus. For example, the cones can extend from a point where an object is in focus toward a direction through the duration focal volume where the object becomes less in focus (note that, for a still object in the scene, an axis of the cones can extend in the time dimension, and, for a moving object in the scene, the an axis of the cones can extend in the time and space dimensions). Characteristics of these cones surrounding the in-focus points can be used as positive samples when training the classification model of process 2100.

At 2106, cones can be extracted around each out-of-focus point within the duration focal volume at different scales (e.g., the duration focal volume can be scaled in a similar fashion as described above in connection with FIG. 16). An apex for the cones of a particular out-of-focus point in the scene can be at an out-of-focus point of a particular object in the scene and the cones can extend through the layers of the duration focal volume toward points where the object becomes even less in-focus, or toward points where the object becomes more in focus. For example, the cones can extend from a point where an object is out-of-focus toward a direction through the duration focal volume where a degree of focus of the object changes (note that, for a still object in the scene, an axis of the cones can extend in the time dimension, and, for a moving object in the scene, the an axis of the cones can extend in the time and space dimensions). Characteristics of these cones surrounding the out-of-focus points can be used as negative samples when training the classification model of process 2100.

At 2108, the classification model can be trained using the positive and negative samples derived at 2104 and 2106 from the duration focal volumes retrieved at 2102. Any suitable technique can be used to train the classification model. For example, in some embodiments, a test set of duration focal volumes with known depth maps can be used to test the classification model and determine whether the classification model has been sufficiently trained by determining if the classification model can successfully replicate the known depth map of the test duration focal volumes. If the classification model cannot successfully reproduce the depth maps for the set of test duration focal volumes, the classification model can be trained using additional duration focal volumes.

After the classification model has been trained at 2102-2108, the trained classification model can be used to identify an in-focus point that corresponds to a point $P_0$ in a duration focal volume V at 2110-2118. At 2110, a point $P_0$ can be selected within duration focal volume V. At 2112, the trained classification model can be used to classify neighboring pixels in the neighborhood of $P_0$ in the time direction based on a specified neighborhood size. In some embodiments, the neighborhood size can be initiated at a predetermined size. For example, the neighbor size can be a cone that extends from point $P_0$ forward and backward in the time dimension and expands at a rate of one pixel for each layer that the cone passes through. Any suitable dimensions can be used as an initial neighborhood size.

At 2114, it can be determined whether the classification model found a positive neighbor in the neighborhood searched in 2112. Positive neighbors can be determined in any suitable manner. For example, in some embodiments, a positive neighbor is a pixel that has surrounding cones that are determined by the classification model to be similar to the shape of cones that surround in-focus pixels. If no positive neighbor is found ("NO" at 2114), process 2100 can proceed to 2116 where a neighborhood size can be increased, and process 2100 can return to 2112. For example, a rate at which a cone expands as it moves through the layers of duration focal volume V can be increased. Otherwise, if a positive neighbor is found ("YES" at 2114), process 2100 can set the depth of the positive neighbor as an index depth for point $P_0$ at 2118.

In some embodiments, the classification phase can be performed for each point within the duration focal volume to create a three-dimensional space-time index map. Such a three dimensional space-time index map can be used, as described above, to indicate an in-focus layer for each point in the duration focal volume.

Figure 22:
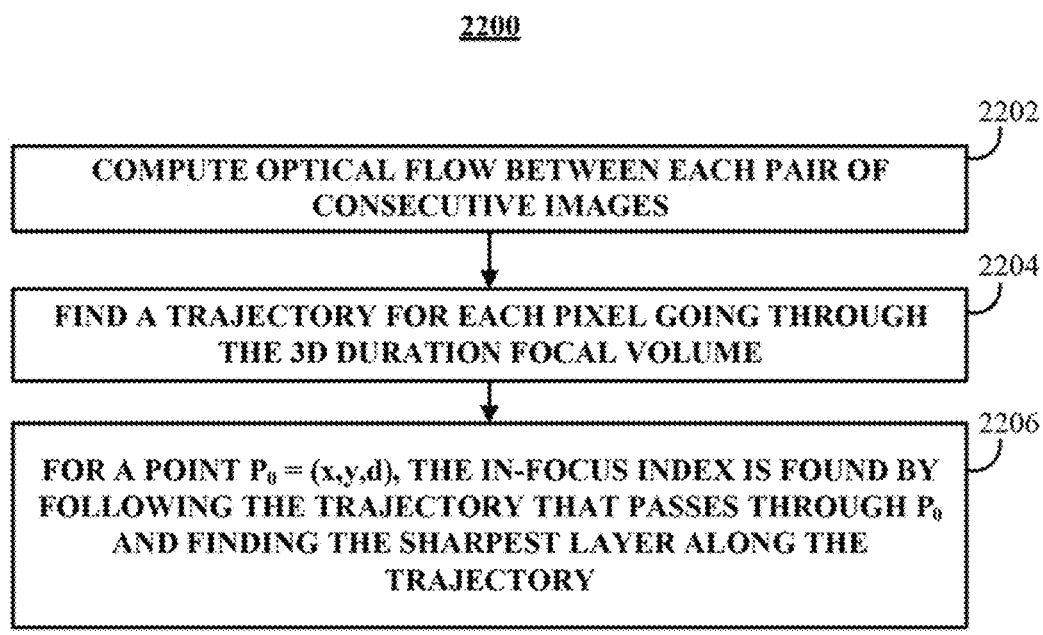
FIG. 22 shows an example of a process for computing a space-time index map for a duration focal volume using optical flow in accordance with some embodiments of the disclosed subject matter.

FIG. 22 shows an example 2200 of a process for using an estimated optical flow in a duration focal volume to identify a layer that corresponds to an in-focus point for an object at a point $P_0$ within a duration focal volume in accordance with some embodiments. Process 2200 can begin at 2202 by computing an optical flow between each pair of consecutive frames within the duration focal volume that can map changes from one image to the next. Any suitable technique can be used for calculating an optical flow between consecutive frames. For example, the optical flow algorithm can be used to determine an optical flow between consecutive frames. As another example, block matching techniques can be used between consecutive frames to calculate an optical flow. As yet example, if there are n frames in the duration focal volume, then n-1 optical flow maps can be generated, where each map can describe how pixels in one frame move with respect to the next frame.

At 2204, a trajectory can be found for each pixel going through the duration focal volume. In some embodiments, a trajectory $T=\{p_1, p_2, p_3, \ldots, p_m\}$ can be determined for each point $P_0$ in the duration focal volume, where $p_k$ identifies a point (x,y) in layer k that is included in the trajectory for point $P_0$. Additionally or alternatively, if a point $P_0$ is included in a trajectory for another point, the trajectory for $P_0$ can be copied from the trajectory of the another point without determining a new trajectory for $P_0$.

At 2206, an in-focus index layer can be found for a point $P_0$ by following the trajectory T that passes through $P_0$ and finding a layer where the point in the trajectory at that layer is the sharpest point along trajectory T. In some embodiments, sharpness measurement techniques used in process 1600 and/or process 2100 can be used to determine which point in trajectory T is the sharpest point.

Process 2200 can be repeated for each point in the duration focal volume and the results for each point can be used to create a three-dimensional space-time index map. Such a three dimensional space-time index map can be used, as described above, to indicate an in-focus layer for each point in the duration focal volume.

Although the techniques described herein have mainly been described in relation to constructing a space-time index map (or three dimensional space-time index map), the techniques can be used as required to re-focus an image from a duration focal volume where a space-time index map has not previously been calculated.

The mechanisms described herein can be used in a variety of applications. For example, a duration focal volume of a scene can be captured and an image from the duration focal volume can be displayed to a user. The user can select a point in the image to bring into focus and the point selected by the user can be brought into its sharpest focus by displaying the image where the point is in sharpest focus from among the images that make up the duration focal volume. In some cases intermediate images between a current image of the duration focal volume where the point is selected and the image where the point is in sharpest focus can be displayed to the user to provide a refocusing visual effect to the user.

In another example, a space-time all-in-focus image can be displayed to a user. In some cases, the space-time all-in-focus image can be presented as an extended depth of field (EDOF) image. In such an example, a weighted sum for each point in the scene over the duration focal volume can be averaged over the time dimension. Using this technique, as described above in connection with FIG. 15, the sharpest location at each point in the scene can be combined to form a space-time in-focus image where each point is in an in-focus state over the entire scene. This can allow for a simulated image to be generated as a single image where each point in the scene appears in focus.

In yet another example, the mechanisms described herein can be used to generate a selective focus image where a selected region (or regions) of an image is shown in focus while the rest of the image is out of focus. Images where a part of the image is in-focus while the rest of the image is out-of-focus are sometimes referred to as a synthetic depth of field image or a tilt-shift image. In such an example, a duration focal volume of a scene can be captured and an image from the duration focal volume can be displayed to a user. The user can select a portion of the scene to display in an in-focus state. The duration focal volume can be analyzed to determine an image (or images) from the duration focal volume where the portion selected by the user is in sharpest focus. The duration focal volume can also be analyzed to determine an image (or images) where the remainder of the scene (e.g., the portion of the scene not selected by the user) is in an out-of-focus (or least sharp) state. The selected portion of the scene can be displayed to the user in an in-focus state, and the portion that was not selected can be displayed to the user in an out-of-focus state.

In still another example, video can be captured using the mechanisms described herein, where the frames of the video can be combined into duration focal volumes. This can allow a user can to select any point in the video to bring into focus.

Accordingly, systems, methods, and media for providing interactive refocusing in images are provided.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 1, 13-18 and 20-22 can be executed or performed in any order or sequence not limited to the order and sequence shown and described in the figures. Also, some of the above steps of the processes of FIGS. 1, 13-18 and 20-22 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for providing interactive refocusing, the system comprising:
   a hardware processor configured to:
      cause a first image of a scene to be displayed to a user, wherein the first image is one a plurality of images captured of the scene at different points in time, wherein each of the plurality of images is captured at a different one of a plurality of depths of field, and wherein the scene includes a moving object that is moving over the different points in time;
      receive a selection of a first point in the first image by the user, wherein the first point corresponds to a first location in the scene at which a portion of the moving object is located;
      identify a second image of the scene in which the portion of the moving object is in focus, wherein the second image is a different one of the plurality of images from the first image, wherein the portion of the moving object is at a second location in the scene that is different from the first location in the scene, and wherein the second location corresponds to a second point in the second image that is different from the first point in the first image; and
      cause the second image to be displayed to the user.

2. The system of claim 1, wherein the hardware processor is further configured to cause one or more intermediate images, captured between the capturing of the first image of the scene and the capturing of the second image of the scene, to be displayed to the user prior to displaying the second image.

3. The system of claim 2, wherein the one or more intermediate images is a plurality of intermediate images.

4. The system of claim 1, wherein identifying the second image of the scene in which the portion of the moving object is in focus comprises using an in-focus index map.

5. The system of claim 1, wherein the hardware processor is further configured to:
   generate a third image in which each point in the images is in focus; and
   cause the third image to be presented to the user.

6. The system of claim 1, wherein the hardware processor is further configured to:
   receive a selectin of a region of the first image that is less than the entirety of the first image, wherein the region includes a plurality of points;
   generate a fourth image in which all of the plurality of points in the region of the first image are in focus and all points outside of the region are out of focus; and
   cause the fourth image to be presented to the user.

7. The system of claim 1, wherein each of the plurality of images is a frame of a video.

8. A method for providing interactive refocusing, the method comprising:
   causing a first image of a scene to be displayed to a user, wherein the first image is one a plurality of images captured of the scene at different points in time, wherein each of the plurality of images is captured at a different one of a plurality of depths of field, and wherein the scene includes a moving object that is moving over the different points in time;
   receiving a selection of a first point in the first image by the user, wherein the first point corresponds to a first location in the scene at which a portion of the moving object is located;
   identifying a second image of the scene in which the portion of the moving object is in focus, wherein the second image is a different one of the plurality of images from the first image, wherein the portion of the moving object is at a second location in the scene that is different from the first location in the scene, and wherein the second location corresponds to a second point in the second image that is different from the first point in the first image; and
   causing the second image to be displayed to the user.

9. The method of claim 8, further comprising causing one or more intermediate images, captured between the capturing of the first image of the scene and the capturing of the second image of the scene, to be displayed to the user prior to displaying the second image.

10. The method of claim 9, wherein the one or more intermediate images is a plurality of intermediate images.

11. The method of claim 8, wherein identifying the second image of the scene in which the portion of the moving object is in focus comprises using an in-focus index map.

12. The method of claim 8, further comprising:
    generating a third image in which each point in the image is in focus; and
    causing the third image to be presented to the user.

13. The method of claim 8, further comprising:
    receiving a selection of a region of the first image that is less than the entirety of the first image, wherein the region includes a plurality of points;
    generating a fourth image in which all of the plurality of points in the region of the first image are in focus and all points of the region are out of focus; and
    causing the fourth image to be presented to the user.

14. The method of claim 8, wherein each of the plurality of images is a frame of a video.

15. A non-transitory computer readable medium containing computer executable instructions that, when executed by a processor, cause the processor to perform a method for providing interactive refocusing, the method comprising:
    causing a first image of a scene to be displayed to a user, wherein the first image is one a plurality of images captured of the scene at different points in time, wherein each of the plurality of images is captured at a different one of a plurality of depths of field, and wherein the scene includes a moving object that is moving over the different points in time;

receiving a selection of a first point in the first image by the user, wherein the first point corresponds to a first location in the scene at which a portion of the moving object is located;

identifying a second image of the scene in which the portion of the moving object is in focus, wherein the second image is a different one of the plurality of images from the first image, wherein the portion of the moving object is at a second location in the scene that is different from the first location in the scene, and wherein the second location corresponds to a second point in the second image that is different from the first point in the first image; and causing the second image to be displayed to the user.

16. The non-transitory computer readable medium of claim 15, further comprising causing one or more intermediate images, captured between the capturing of the first image of the scene and the capturing of the second image of the scene, to be displayed to the user prior to displaying the second image.

17. The non-transitory computer readable medium of claim 16, wherein the one or more intermediate images is a plurality of intermediate images.

18. The non-transitory computer readable medium of claim 15, wherein identifying the second image of the scene in which the portion of the moving objects is the focus comprises using an in-focus index map.

19. The non-transitory computer readable medium of claim 15, wherein the method further comprises:

generating a third image in which each point in the image is in focus; and causing the third image to be presented to the user.

20. The non-transitory computer readable medium of claim 15, wherein the method further comprises:

receiving a selection of a region of the first image that is less than the entirety of the first image, wherein the region includes a plurality of points;

generating a fourth image in which all of the plurality of points in the region of the first image are in focus and all points outside of the region are out of focus; and causing the fourth image to be presented to the user.

\* \* \* \* \*